US007698175B2

(12) United States Patent
Franz et al.

(10) Patent No.: US 7,698,175 B2
(45) Date of Patent: Apr. 13, 2010

(54) INBOUND AND OUTBOUND SHIPMENT NOTIFICATION METHODS AND SYSTEMS

(75) Inventors: Daniel Franz, Alpharetta, GA (US); Elizabeth Purrington, Atlanta, GA (US); Eugene B. Wimby, Jr., Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 1219 days.

(21) Appl. No.: 10/265,079

(22) Filed: Oct. 4, 2002

(65) Prior Publication Data

US 2003/0097287 A1 May 22, 2003

Related U.S. Application Data

(60) Provisional application No. 60/327,251, filed on Oct. 5, 2001, provisional application No. 60/395,716, filed on Jul. 12, 2002.

(51) Int. Cl.
*G06Q 10/00* (2006.01)
*G06Q 30/00* (2006.01)
*G06F 17/30* (2006.01)
*G07G 1/00* (2006.01)

(52) U.S. Cl. ............................. 705/28; 705/1; 705/10

(58) Field of Classification Search .................. 705/8, 705/28
See application file for complete search history.

(56) References Cited

U.S. PATENT DOCUMENTS

| 5,375,240 | A |   | 12/1994 | Grundy |         |
|-----------|---|---|---------|--------|---------|
| 5,869,819 | A | * | 2/1999  | Knowles et al. | 235/375 |
| 5,917,925 | A | * | 6/1999  | Moore  | 382/101 |
| 6,047,264 | A |   | 4/2000  | Fisher et al. |  |
| 6,070,793 | A | * | 6/2000  | Reichl et al. | 235/375 |
| 6,208,910 | B1| * | 3/2001  | Michael et al. | 700/225 |
| 6,208,980 | B1|   | 3/2001  | Kara   |         |
| 6,220,509 | B1| * | 4/2001  | Byford | 235/375 |
| 6,236,972 | B1|   | 5/2001  | Shkedy |         |
| 6,285,916 | B1|   | 9/2001  | Kadaba et al. | |
| 6,343,275 | B1|   | 1/2002  | Wong   |         |
| 6,356,196 | B1|   | 3/2002  | Wong et al. |    |
| 6,427,021 | B1| * | 7/2002  | Fischer et al. | 382/101 |

(Continued)

FOREIGN PATENT DOCUMENTS

WO          WO 00/30014 A1          5/2000

(Continued)

OTHER PUBLICATIONS

Anonymous, "GoShop Announces New Service Offering; Solutions for SOHO, Medium and Enterprise Class Businesses," Dec. 1, 2000; PR Newswire, pp. 2.*

(Continued)

*Primary Examiner*—F. Zeender
*Assistant Examiner*—Asfand M. Sheikh
(74) *Attorney, Agent, or Firm*—Alston & Bird LLP

(57) ABSTRACT

The present invention is generally directed to systems and methods to provide a user with visibility to packages that are inbound to and outbound from the user. A preferred embodiment describes a subscription system that allows the user to determine the frequency and format of package visibility information, and various tools are disclosed to automate and customize the presentation of package visibility information to the user.

31 Claims, 19 Drawing Sheets

U.S. PATENT DOCUMENTS

| | | | |
|---|---|---|---|
| 6,430,541 B1 | 8/2002 | Brown et al. | |
| 6,463,420 B1* | 10/2002 | Guidice et al. | 705/28 |
| 6,654,726 B1* | 11/2003 | Hanzek | 705/26 |
| 6,772,130 B1* | 8/2004 | Karbowski et al. | 705/26 |
| 6,931,388 B2* | 8/2005 | Robbins | 707/1 |
| 2002/0008639 A1 | 1/2002 | Dee | |
| 2002/0010634 A1 | 1/2002 | Roman et al. | |
| 2002/0013744 A1 | 1/2002 | Tsunenari et al. | |
| 2002/0016726 A1 | 2/2002 | Ross | |
| 2002/0019761 A1 | 2/2002 | Lidow | |
| 2002/0032612 A1 | 3/2002 | Williams et al. | |
| 2002/0032623 A1* | 3/2002 | Wheeler et al. | 705/28 |
| 2002/0073039 A1 | 6/2002 | Ogg et al. | |
| 2002/0103766 A1* | 8/2002 | Chi | 705/74 |
| 2002/0111819 A1* | 8/2002 | Li et al. | 705/1 |
| 2005/0004978 A1 | 1/2005 | Reed et al. | |
| 2009/0146832 A1 | 6/2009 | Ebert et al. | |

FOREIGN PATENT DOCUMENTS

| | | |
|---|---|---|
| WO | WO 00/46726 | 8/2000 |
| WO | WO 00/46728 | 8/2000 |
| WO | WO 01/16889 A1 | 3/2001 |
| WO | WO 01/29778 A1 | 4/2001 |
| WO | WO 01/35344 A2 | 5/2001 |
| WO | WO 01/65454 A2 | 9/2001 |
| WO | WO 01/67344 A1 | 9/2001 |
| WO | WO 01/72109 A2 | 10/2001 |
| WO | WO 01/88831 A2 | 11/2001 |
| WO | WO 02/07104 A1 | 1/2002 |
| WO | WO 02/17045 A2 | 2/2002 |
| WO | WO 02/052378 A2 | 7/2002 |

OTHER PUBLICATIONS

Business Editors, "FedEx InSight Empowers Customers with Enhanced Shipment Visibility and Control," May 5, 2001, Business Wire, pp. 3.*

El Portal Del Transporte, FedEx Insight Empowers Customers with Enhanced Shipment Visibility and Control, Article, Apr. 11, 2001 (Retrieved on Apr. 25, 2003), p. 9, Paragraph 4—p. 10, Line 7, Retrieved from the Internet: <URL:http://www.transportando.net/newsabril_completa.htm>.

Pender, Lee, Hard Times Are The Best Times, Magazine, Aug. 15, 2001 (Retrieved on Apr. 25, 2003), p. 3, Paragraph 3, Retrieved from the Internet: <URL:http://www.cio.com/archive/081501/besttimes_content.html>.

Frontline Solutions, FedEx Improves Internal, External Operations, Article, Apr. 5, 2001 (Retrieved from the Internet Apr. 25, 2003), p. 1 (last line) through p. 2, Paragraph 9, Retrieved from the Internet: <URL:http://www.frontlinemagazine.com/art_th/o4052001.htx>, Fairfax, Virginia and Memphis, Tennessee.

Brewin, Bob and Rosencrance, Linda, Follow That Package!, Article, Mar. 19, 2001 (Retrieved from the Internet Apr. 25, 2003), p. 1-p. 5, Retrieved from the Internet: URL:http://www.computerworld.com./printthis/2001/0,4814,58696.00.html, Computer World.

Van Huzien, Gordon, Messaging: The Transport Part of The XML Puzzle, Article, Jul. 2000 (Retrieved from the Internet Apr. 25, 2003: <URL:http://www-106.ibm.com/developerworks/library/xml-messaging/>.

De Marco, Donna, E-Tail Presents Can Be Tougher to Send Back Than Order, Journal, Dec. 28, 1999, Downloaded from the Internet on October 3, 2002, Accession No. 08891512, Knight-Ridder/Tribune Business News, The Dialog Corporation, United States.

Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.

Henderson, Timothy, Buy.com Boosts Returns Process Efficiency With New Solution, Periodical, Nov. 2000, Downloaded from the Internet on Oct. 3, 2002, pp. 72-76, vol. 82n11, Accession No. 02102731, ProQuest Info&Learning, United States of America.

Many Happy Returns—UPS Unvels Advanced Outline Returns Solution, Journal, Sep. 20, 2000, Downloaded from the Internet on Oct. 3, 2002, Accession No. 12921102, Business Wire, United States of America.

FedEx Helps Customers Manage Their Inventory in Motion with FedEx InSight SM; FedEx News Release; http://www.prdomain.com/companies/f/fed_ex/news_releases/200203mar/pr_fedex_nr_20020308.htm; accessed on Oct. 20, 2009 via http://web.archive.org; version provided uploaded Sep. 10, 2002; pp. 1-3.

* cited by examiner

Quantum View Inbound

View → Subscription → Location → File → Confirm
Profile    Details       IDs    Preferences Select an Quantum View Inbound service option and create a unique name for this subscription to differentiate it from otheres you may have. Also select or enter UPS Account number to use for billing charges for the subscription. Charges are based on your usage per week. Review pricing details.

Please note: You must have billing authority on the UPS Account number you enter. If you do not, you will have the option of requesting billing permission form an administrator.

SUBSCRIPTION NAME

Enter a descriptive name for your subscription:

[                    ]

(up to 21 characters)

UPS    NASCAR
OFFICIAL DELIVERY COMPANY

- VIEW △ MY UPS.COM
- MY UPS.COM HOME
- UPS Visibility Services
- Quantum View Inbound
  - Quantum View Summary
  - Get Files
  - Sign Up
  - Learn More
  - Quantum View FAQ
- LOG OUT Service Guide | E-Business | Customer Service | About UPS | Site Guide

TRACK | SHIP | RATES | TRANSIT TIME | PICKUP | DROP-OFF | SUPPLIES

*Fig. 3H*

SERVICE OPTIONS

Select Service Option:

○ Inbound Notification - shipment information for packages en route to you including manifest detail, scheduled delivery date, and exception updates.

○ Inbound and Delivery Notification - shipment information for packages en route to you including manifest detail, scheduled delivery date, exception updates, and delivery updates with full delivery address.

UPS ACCOUNT NUMBER FOR BILLING

Select a UPS Account number to bill subscription charges to:

Select UPS Account ▽

OR

Enter a UPS Account number to bill subscription charges to:

Postal Code: [ ]

County: [ ]

[United States]

[CONTINUE]  [CANCEL]

*Fig. 3B*

Quantum View Inbound

View → Subscription → Location → File → Confirm
Profile       Details        IDs    Preferences A Location ID is a unique Identifier that designates specific receiving location. There are three ways to associate a Location ID with your subscription: create, select, and enter Location IDs below. Add at least one Location ID to your subscription.

Please note: If you enter a Location ID that youare not authorized to use, a request to use the Location ID will be sent to the appropriate administrator.

LOCATION ID

Create a Location ID

OR

Select a Location ID, then, select Add to List. the Locatino ID will appear in the box at the bottom of this page.
Select Location ID
[Select Location ID ▽]   [ADD TO LIST ▽]   conditional display

OR

UPS Visibility Services
Quantum View Inbound
- Quantum View Summary
- Get Files
- Sign Up
- Learn More
- Quantum View FAQ

- LOG OUT

*Fig. 4H*

Enter a Location ID, then select Add to List, the Location ID will appear in the box at the bottom of this page.

Enter Location ID

ADD TO LIST ▽

ENTER MORE LOCATION ID'S

LOCATION ID LIST

These Location ID's will be Included in your subscription:

To remove a Locatin ID, highlight it, then select Remove.

REMOVE

CONTINUE

CANCEL

*Fig. 4B*

Quantum View Outbound - Service Options and Billing - Microsoft Internet Explorer File  Edit  View  Favorite  Tools  Help Address  http://10.230.138.99/ic   Go

Select Service Option:

○ Outbound Notification - shipment information for packages you ship Including manifest detail, exception and delivery updates, and full delivery address.
  ☐ Add more detail (29 additional elements)

○ Delivery Notification - shipment informaiton for packages you ship including manifest detail and delivery updates with full delivery address.
  ☐ Add more detail (29 additional elements)

○ Exception Notification - shipment informaiton for packages you ship when there is a chance to the scheduled delivery date.
  ☐ Add more detail (29 additional elements)

UPS ACCOUNT NUMBER FOR BILLING                    conditional display

Select a UPS Account number to bill subscription charges to:

Select UPS Account

OR

Enter a UPS Account number to bill subscription charges to:

Postal Code: ☐

Country: ☐ United States

*Fig. 7B*

Quantum View Outbound - Service Options and Billing - Microsoft Intrernet Explorer File   Edit   View   Favorite   Tools   Help Address   http://10.230.138.99/ic   Go

OR

Enter a UPS Account number to bill subscription charges to:

Postal Code:

Country:
United States

☐ Include this billing account number in my list of accounts for Quantum View Outbound.

CONTINUE    CANCEL

If box is checked, account should automatically appear in the list on Step 3.

Home | Track | Ship | Rates | Transit Time | Pickup | Drop-off | Supplies |
Service Guide | E-Business | Customer Service | About UPS | Site Guide | MYU
UPS.COM Copyright 1994-2001 United parcel Serivce of America, Inc. All Rights Reserved.
NASCAR is a registered trademark of the National Association for Stock Car Auto
Racing, Inc.
Trademark and Trail Information

Quantum View Outbound - Add UPS Accounts- Microsoft Internet Explorer

File   Edit   View   Favorite   Tools   Help

Address  http://10.230.138.99/ic

OR

Enter a UPS Account number, then select Add to List. The account will appear in the box at the bottom fo this page.

Enter UPS Accont Number

[        ]
   ↖
   125

Postal Code:
[        ]

Country:
[United States ▼]

ADD TO LIST ▽

ENTER MORE ACCOUNTS

UPS ACCOUNT LIST
These UPS Accounts will be included in your subscription:

[        ]

To remove an account from the list, highlight it and then select Remove.

REMOVE

CONTINUE    CANCEL

INBOUND AND OUTBOUND SHIPMENT NOTIFICATION METHODS AND SYSTEMS

CROSS REFERENCE TO RELATED APPLICATION

This application claims the benefit of priority from the U.S. provisional application No. 60/327,251 filed on Oct. 5, 2001, entitled "Systems And Methods For Inbound And Outbound Shipment," and from U.S. provisional application No. 60/395,716 filed on Jul. 12, 2002, entitled "Systems and Methods for Inbound and Outbound Shipment Notification," the entire contents of which are hereby incorporated by reference.

FIELD OF THE INVENTION

The present invention provides for methods and systems for delivering aggregated information based services without the use of a tracking number. Notification systems and processes are disclosed for proactively updating a user with package information.

BACKGROUND OF THE INVENTION

Package tracking is an integral part of a package delivery service that allows a customer to track goods that they have shipped or that have been shipped to them. The advent of the Internet has allowed commercial carriers such as the United Parcel Service (UPS) to make it possible for customers to track their shipments online. Some businesses have taken package tracking a step further and integrated the package tracking functionality into their internal business systems. Thus, businesses have the ability to trigger business events based upon shipment status information received from a commercial carrier.

For the most part, package tracking services known in the art operate on an package by package basis and require that a customer query a carrier database with a package tracking number associated with the package to be tracked. As a result, it is difficult for a company with a heavy volume of inbound or outbound shipping to track all its packages currently in transit. Companies are often stuck with the burdensome task of individually tracking large numbers of packages or risk being surprised when an abnormally large number of packages arrives at its loading docks with insufficient help to dispatch it. An unsatisfied need therefore exists in the industry for a package tracking methods and systems that overcomes this and other problems.

SUMMARY OF THE INVENTION

The present invention is generally directed to systems and methods to provide a user with visibility to packages that are inbound to and outbound from the user. A preferred embodiment describes a subscription system that allows the user to determine the frequency and format of package visibility information, and various tools are disclosed to automate and customize the presentation of package visibility information to the user.

In accordance with one embodiment of the present invention, a package tracking system that provides visibility for inbound packages is described that includes a carrier database that stores package information about one or more packages that are in transit in a carrier system; a visibility engine in communication with the carrier database, the visibility engine configured to review said package information and to identify a package that is inbound to a location identifier associated with a user; and a user computer in communication with said visibility engine via a network, the user computer configured to receive shipping information associated with the inbound package.

In accordance with another embodiment of the present invention, a package tracking system that provides visibility for inbound packages is described that includes a carrier database that stores package level detail information about one or more packages that are in transit in a carrier system; a visibility engine in communication with the carrier database, the visibility engine configured to review said package information and to identify a package that is inbound to a location identifier associated with a user using the location identifier in the package level detail; and a user computer in communication with said visibility engine via a network, the user computer configured to receive shipping information associated with the inbound package.

In accordance with another embodiment of the present invention, a package tracking system that provides visibility for inbound packages is described that includes a carrier database that stores package information about one or more packages that are in transit in a carrier system; a visibility engine in communication with the carrier database, the visibility engine configured to review said package information and to identify a package that is inbound to a location identifier associated with a user; and a user computer in communication with said visibility engine via a network, the user computer configured to receive shipping information associated with the inbound package, and the user computer further configured to initiate a request for inbound package tracking through the package visibility engine.

In accordance with another embodiment of the present invention, a package tracking system that provides visibility for inbound packages is described that includes a carrier database that stores package information about one or more packages that are in transit in a carrier system; a visibility engine in communication with the carrier database, the visibility engine configured to review said package information and to identify a package that is inbound to a location identifier associated with a user; and a user computer in communication with said visibility engine via a network, the user computer configured to receive shipping information associated with the inbound package, and the user computer further configured to request that the visibility engine send the shipping information in a specified format.

In accordance with another embodiment of the present invention, a package tracking system that provides visibility for inbound packages is described that includes a carrier database that stores package information about one or more packages that are in transit in a carrier system; a visibility engine in communication with the carrier database, the visibility engine configured to review said package information and to identify a package that is inbound to a location identifier associated with a user; and a user computer in communication with said visibility engine via a network, the user computer configured to receive shipping information associated with the inbound package, and wherein the user computer is further configured to request that the visibility engine send the shipping information in at least one of an XML format, a comma-separated value format and a flat file format.

In accordance with another embodiment of the present invention, a package tracking system that provides visibility for inbound packages is described that includes a carrier database that stores package information about one or more packages that are in transit in a carrier system; a visibility engine in communication with the carrier database, the visibility engine configured to review said package information and to identify a package that is inbound to a location identifier associated with a user; and a user computer in communication with said visibility engine via a network, the user computer configured to receive shipping information associated with the inbound package, and wherein the user computer is further configured to specify a frequency for receiving the shipping information.

In accordance with another embodiment of the present invention, a package tracking system that provides visibility for inbound packages is described that includes a carrier database that stores package information about one or more packages that are in transit in a carrier system; a visibility engine in communication with the carrier database, the visibility engine configured to review said package information and to identify a package that is inbound to a location identifier associated with a user; and a user computer in communication with said visibility engine via a network, the user computer configured to receive shipping information associated with the inbound package, and wherein the user computer is further configured to receive at least one of an inbound notification service and an inbound and delivery notification service.

In accordance with another embodiment of the present invention, a package tracking system that provides visibility for inbound packages is described that includes a carrier database that stores package information about one or more packages that are in transit in a carrier system; a visibility engine in communication with the carrier database, the visibility engine configured to review said package information and to identify a package that is inbound to a location identifier associated with a user; and a user computer in communication with said visibility engine via a network, the user computer configured to receive shipping information associated with the inbound package, and wherein the package visibility engine is further configured to calculate a forecasted delivery date for the inbound package.

In accordance with another embodiment of the present invention, a method of package tracking that allows a user to receive information about packages that are inbound to the user is described that includes the steps of creating an inbound subscription for the user, wherein the inbound subscription specifies at least one location identifier that is associated with the user, and wherein further the inbound subscription specifies a format and a frequency for receiving inbound package tracking data; capturing shipping data of packages that are in transit in a carrier system; identifying packages that are inbound to the user by comparing the at least one location identifier against the captured shipping data; collecting inbound package tracking data for the identified packages; and transmitting the inbound package tracking data to the user in accordance with the inbound subscription.

In accordance with another embodiment of the present invention, a method of package tracking that allows a user to receive information about packages that are inbound to the user is described that includes the steps of creating an inbound subscription for the user, wherein the inbound subscription specifies at least one location identifier that is associated with the user, and wherein further the inbound subscription specifies a format and a frequency for receiving inbound package tracking data; capturing shipping data of packages that are in transit in a carrier system; identifying packages that are inbound to the user by comparing the at least one location identifier against the captured shipping data; collecting inbound package tracking data for the identified packages; and transmitting the inbound package tracking data to the user in accordance with the inbound subscription, and wherein each of the at least one location identifier is associated with a unique receiving location.

In accordance with another embodiment of the present invention, a method of package tracking that allows a user to receive information about packages that are inbound to the user is described that includes the steps of creating an inbound subscription for the user, wherein the inbound subscription specifies at least one location identifier that is associated with the user, and wherein further the inbound subscription specifies a format and a frequency for receiving inbound package tracking data; capturing shipping data of packages that are in transit in a carrier system; identifying packages that are inbound to the user by comparing the at least one location identifier against the captured shipping data; collecting inbound package tracking data for the identified packages; and transmitting the inbound package tracking data to the user in accordance with the inbound subscription, and wherein the step of transmitting the inbound package tracking data occurs according to the frequency specified by the inbound subscription.

In accordance with another embodiment of the present invention, a method of package tracking that allows a user to receive information about packages that are inbound to the user is described that includes the steps of creating a fee-based inbound subscription for the user, wherein the inbound subscription specifies at least one location identifier that is associated with the user, and wherein further the inbound subscription specifies a format and a frequency for receiving inbound package tracking data; capturing shipping data of packages that are in transit in a carrier system; identifying packages that are inbound to the user by comparing the at least one location identifier against the captured shipping data; collecting inbound package tracking data for the identified packages; and transmitting the inbound package tracking data to the user in accordance with the inbound subscription.

In accordance with another embodiment of the present invention, a method of package tracking that allows a user to receive information about packages that are inbound to the user is described that includes the steps of creating an inbound subscription for the user, wherein the inbound subscription specifies at least one location identifier that is associated with the user, and wherein further the inbound subscription specifies a format and a frequency for receiving inbound package tracking data; capturing shipping data of packages that are in transit in a carrier system; identifying packages that are inbound to the user by comparing the at least one location identifier against the captured shipping data; collecting inbound package tracking data for the identified packages; and transmitting the inbound package tracking data to the user in accordance with the inbound subscription, and wherein the inbound subscription is associated with a carrier account and the step of identifying packages that are inbound to the user comprises comparing the at least one location identifier and the carrier account against the captured shipping data.

In accordance with another embodiment of the present invention, a package tracking system that provides visibility for packages that are outbound from a user is described that includes a carrier database that stores package information about one or more packages that are in transit in a carrier system; a visibility engine in communication with the carrier database, the visibility engine configured to review the package information and to identify a package that is outbound from the user; and a user computer in communication with the visibility engine via a network, the user computer configured to receive shipping information associated with the outbound package.

In accordance with another embodiment of the present invention, a package tracking system that provides visibility for packages that are outbound from a user is described that includes a carrier database that stores package information about one or more packages that are in transit in a carrier system; a visibility engine in communication with the carrier database, the visibility engine configured to review the package information and to identify a package that is outbound from the user; and a user computer in communication with the visibility engine via a network, the user computer configured to receive shipping information associated with the outbound package, wherein the user computer is further configured to initiate a request for outbound package tracking through said package visibility engine and to request that said visibility engine send said shipping information in a specified format and with a specified frequency.

In accordance with another embodiment of the present invention, a package tracking system that allows a user to receive information about packages that are inbound and outbound from the user is described that includes a carrier database that stores shipping information for packages that are in transit in a carrier system; a visibility engine in communication with the carrier database; a user computer in communication with the visibility engine; wherein the visibility engine is configured to create an inbound subscription for a user, wherein the inbound subscription specifies at least one location identifier that is associated with the user, and wherein the visibility engine is configured to identify packages that are inbound to the user by comparing the at least one location identifier against the shipping information; and wherein the visibility engine is further configured to create an outbound subscription for a user, wherein the outbound subscription specifies an account identifier associated with the user, and wherein the visibility engine is configured to identify packages that are outbound from the user by comparing the account identifier against the shipping information, and wherein the visibility engine is further configured to provide package information for packages inbound to and packages outbound from the user with a frequency specified in the inbound or the outbound subscriptions.

In accordance with another embodiment of the present invention, a package tracking system that allows a user to receive information about packages that are inbound and outbound from the user is described that includes a carrier database that stores shipping information for packages that are in transit in a carrier system; a visibility engine in communication with the carrier database; a user computer in communication with the visibility engine; wherein the visibility engine is configured to create an inbound subscription for a user, wherein the inbound subscription specifies at least one location identifier that is associated with the user, and wherein the visibility engine is configured to identify packages that are inbound to the user by comparing the at least one location identifier against the shipping information; and wherein the visibility engine is further configured to create an outbound subscription for a user, wherein the outbound subscription specifies an account identifier associated with the user, and wherein the visibility engine is configured to identify packages that are outbound from the user by comparing the account identifier against the shipping information, and wherein the visibility engine is further configured to provide package information for packages inbound to and packages outbound from the user in a format specified in the inbound or the outbound subscriptions.

In accordance with another embodiment of the present invention, a package tracking system that allows a user to receive information about packages that are inbound and outbound from the user is described that includes a carrier database that stores shipping information for packages that are in transit in a carrier system; a visibility engine in communication with the carrier database; a user computer in communication with the visibility engine; wherein the visibility engine is configured to create an inbound subscription for a user, wherein the inbound subscription specifies at least one location identifier that is associated with the user, and wherein the visibility engine is configured to identify packages that are inbound to the user by comparing the at least one location identifier against the shipping information; and wherein the visibility engine is further configured to create an outbound subscription for a user, wherein the outbound subscription specifies an account identifier associated with the user, and wherein the visibility engine is configured to identify packages that are outbound from the user by comparing the account identifier against the shipping information, and an online file download tool to automate the retrieval of package information.

In accordance with another embodiment of the present invention, a package tracking system that allows a user to receive information about packages that are inbound and outbound from the user is described that includes a carrier database that stores shipping information for packages that are in transit in a carrier system; a visibility engine in communication with the carrier database; a user computer in communication with the visibility engine; wherein the visibility engine is configured to create an inbound subscription for a user, wherein the inbound subscription specifies at least one location identifier that is associated with the user, and wherein the visibility engine is configured to identify packages that are inbound to the user by comparing the at least one location identifier against the shipping information; and wherein the visibility engine is further configured to create an outbound subscription for a user, wherein the outbound subscription specifies an account identifier associated with the user, and wherein the visibility engine is configured to identify packages that are outbound from the user by comparing the account identifier against the shipping information, and an automated access and file download application residing on said the computer, wherein the application is configured to generate an XML request according to at least one user-defined parameter and to retrieve and store package information in a location and format specified by the inbound or outbound subscription.

In accordance with another embodiment of the present invention, a package tracking system that allows a user to receive information about packages that are inbound and outbound from the user is described that includes a carrier database that stores shipping information for packages that are in transit in a carrier system; a visibility engine in communication with the carrier database; a user computer in communication with the visibility engine; wherein the visibility engine is configured to create an inbound subscription for a user, wherein the inbound subscription specifies at least one location identifier that is associated with the user, and wherein the visibility engine is configured to identify packages that are inbound to the user by comparing the at least one location identifier against the shipping information; and wherein the visibility engine is further configured to create an outbound subscription for a user, wherein the outbound subscription specifies an account identifier associated with the user, and wherein the visibility engine is configured to identify packages that are outbound from the user by comparing the account identifier against the shipping information, and a proactive notification tool that provides the user with the ability to request proactive notification of an event in the progress of the package through the carrier system.

BRIEF DESCRIPTION OF THE DRAWINGS

Figure 1:
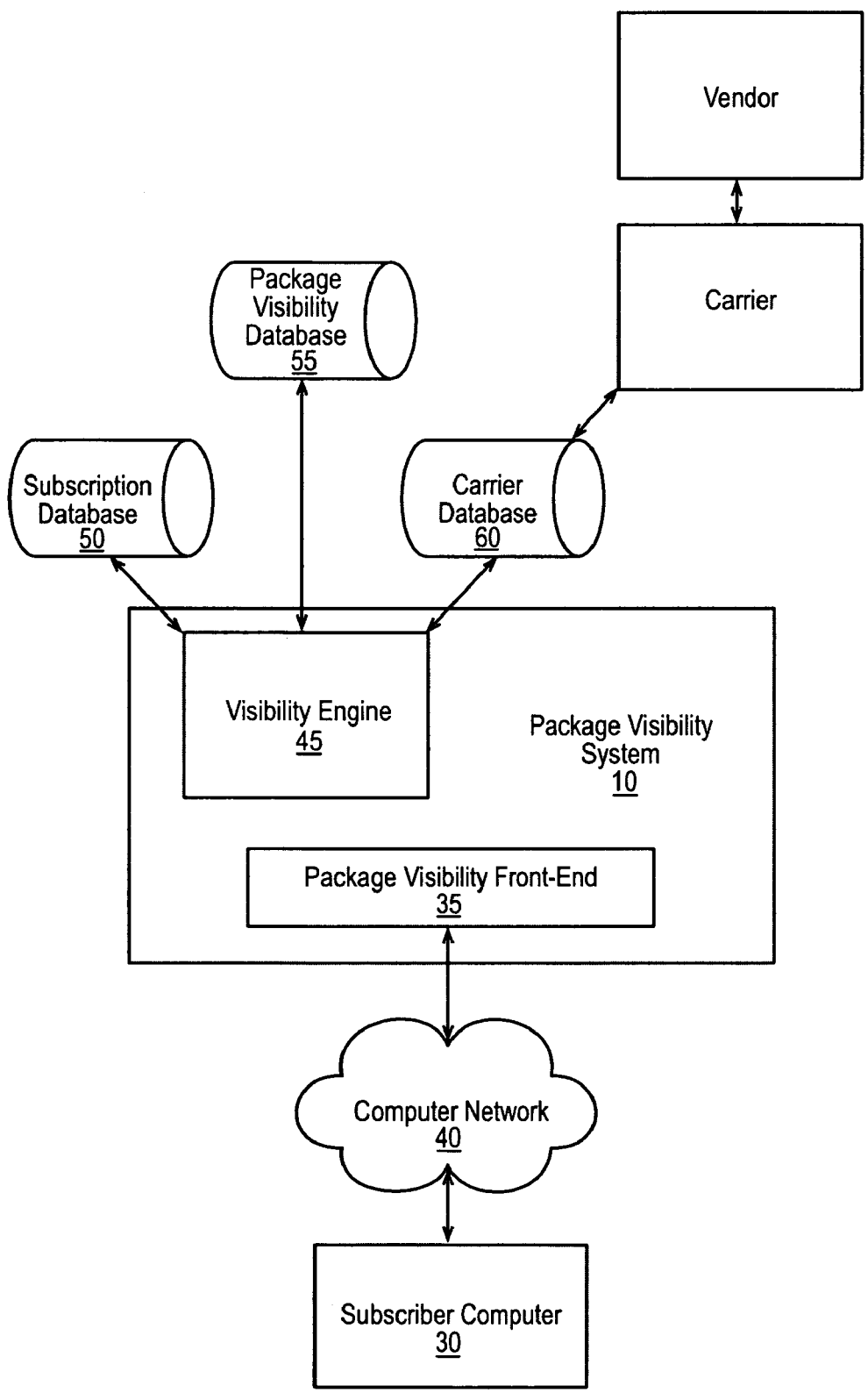

Having thus described the invention in general terms, reference will now be made to the accompanying drawings, which are not necessarily drawn to scale, and wherein:

FIG. 1 is a high-level block diagram of a visibility package system in accordance with an embodiment of the present invention.

Figure 2:
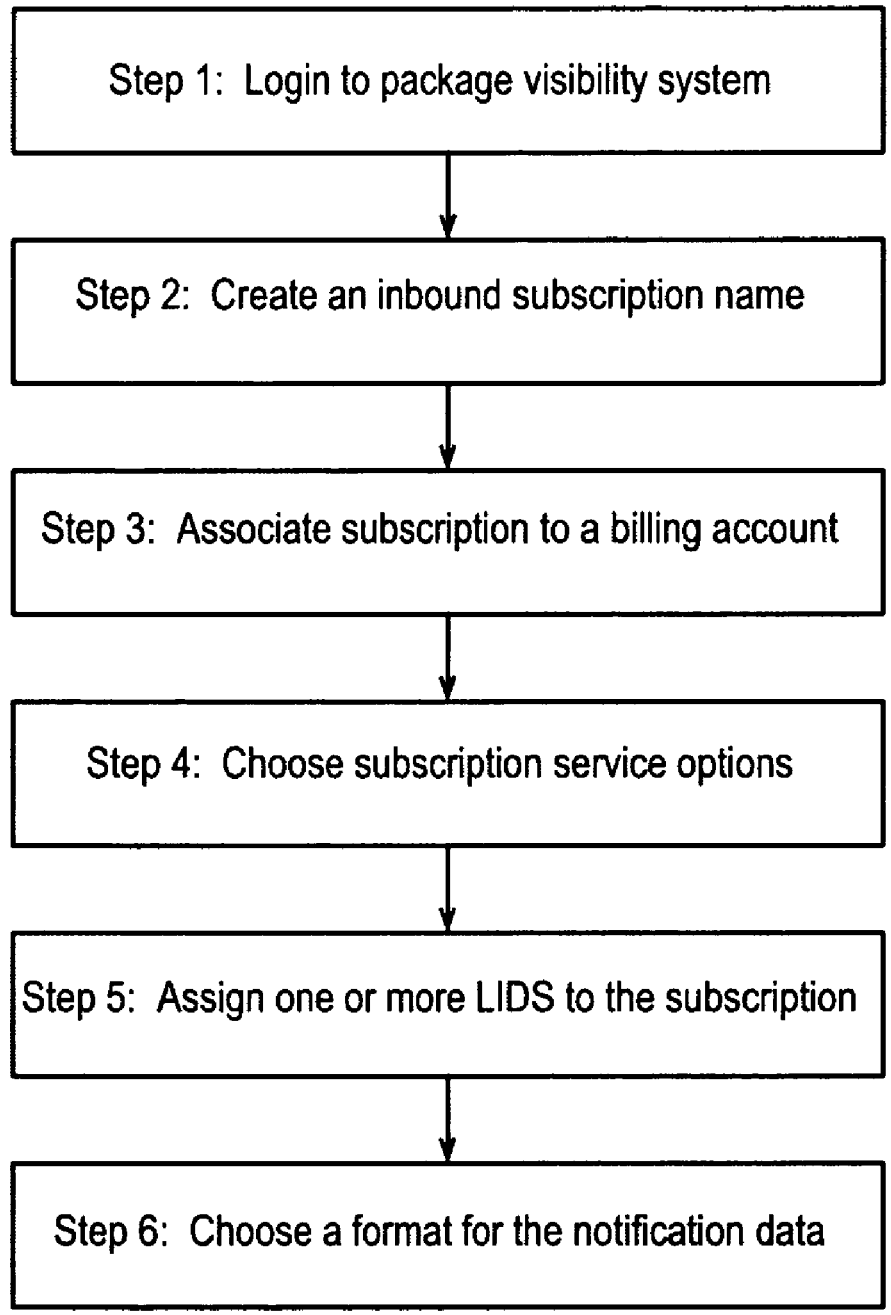

FIG. 2 is a process flow diagram that illustrates the steps used to create an inbound visibility subscription.

FIGS. 3A and 3B show a web page that captures inbound subscription information from a user.

FIGS. 4A and 4B show a web page that prompts a user to associate one or more location identifiers with an inbound subscription.

Figure 5:
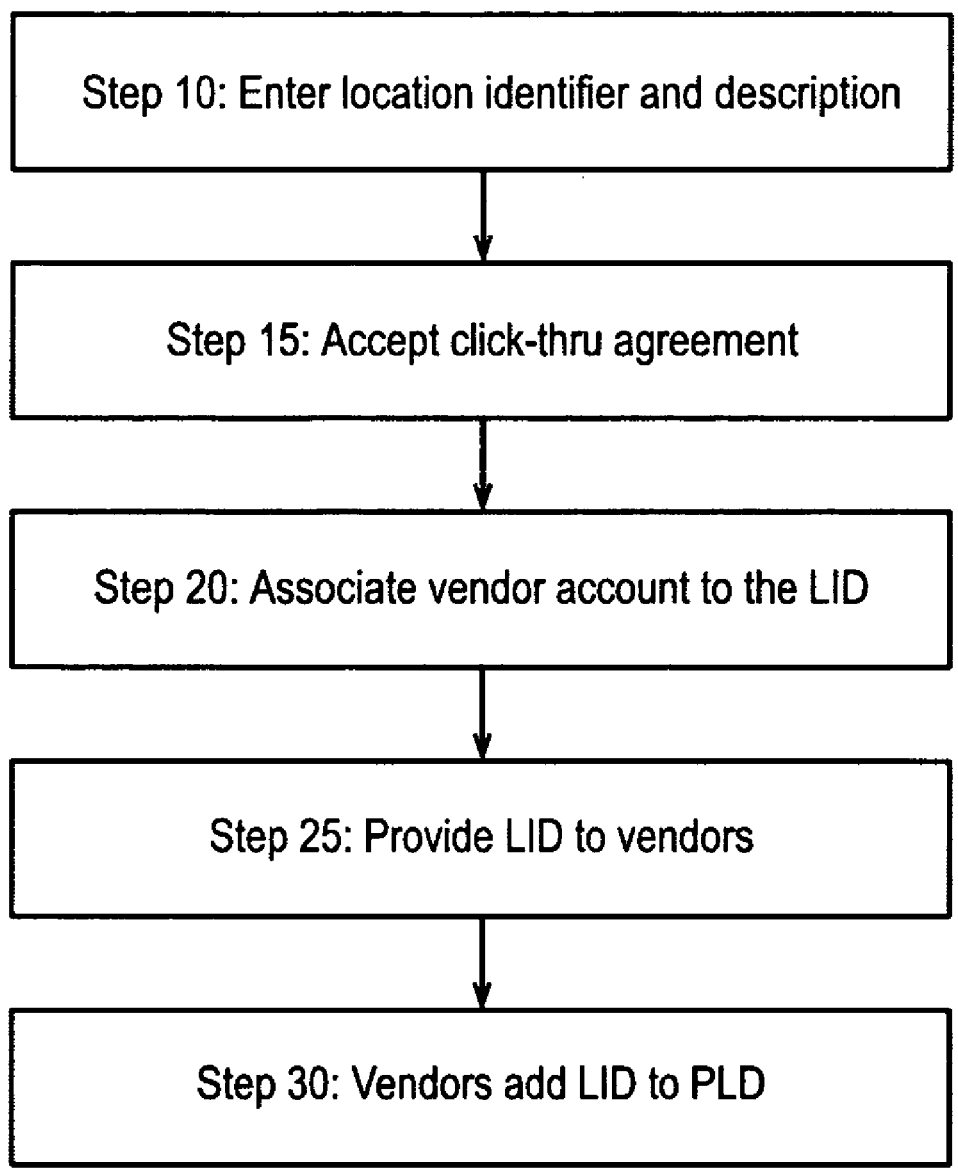

FIG. 5 is a process flow diagram that illustrates the steps used to create a location identifier.

Figure 6:
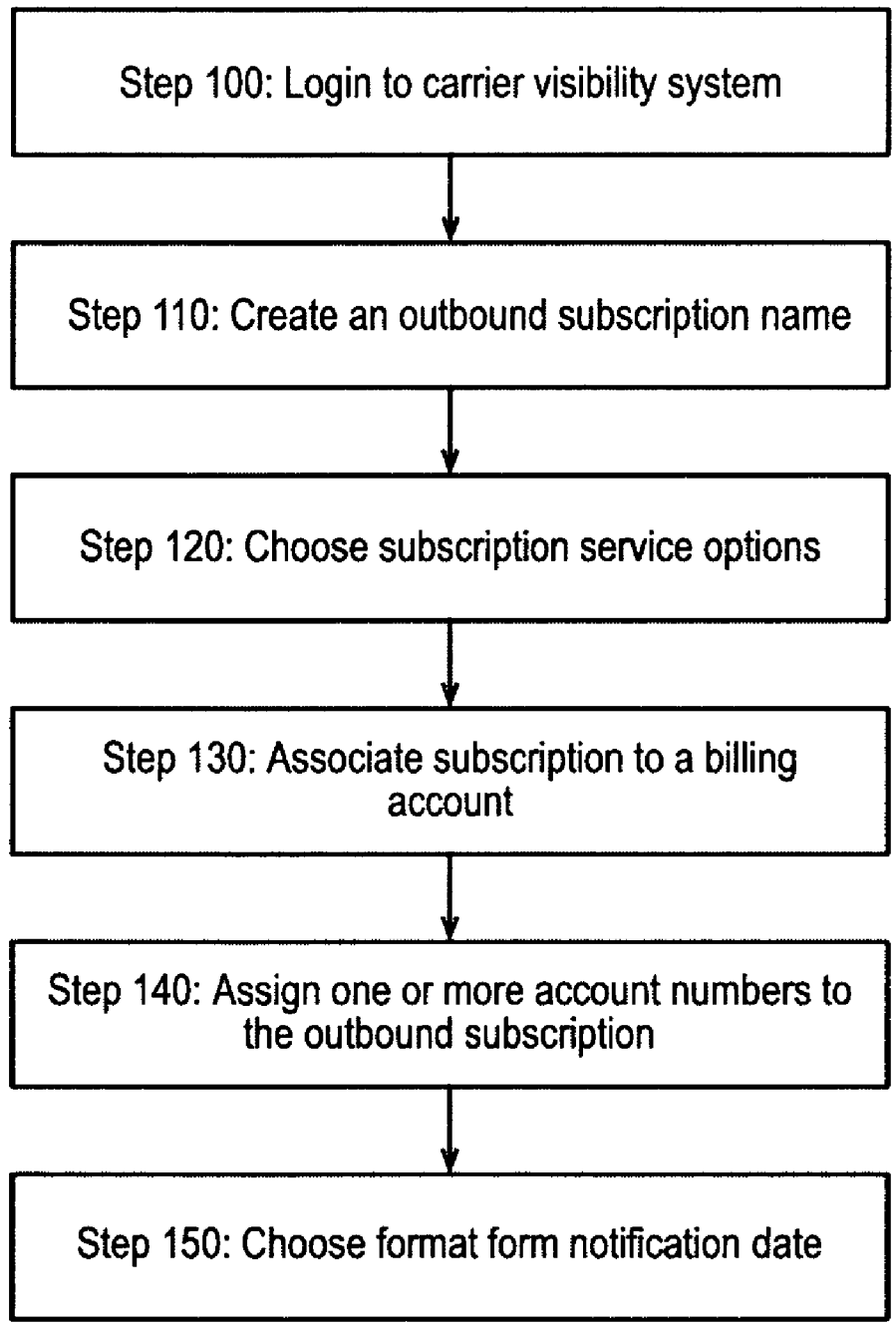

FIG. 6 is a process flow diagram that illustrates the steps used to create an outbound visibility subscription.

Figure 7H:
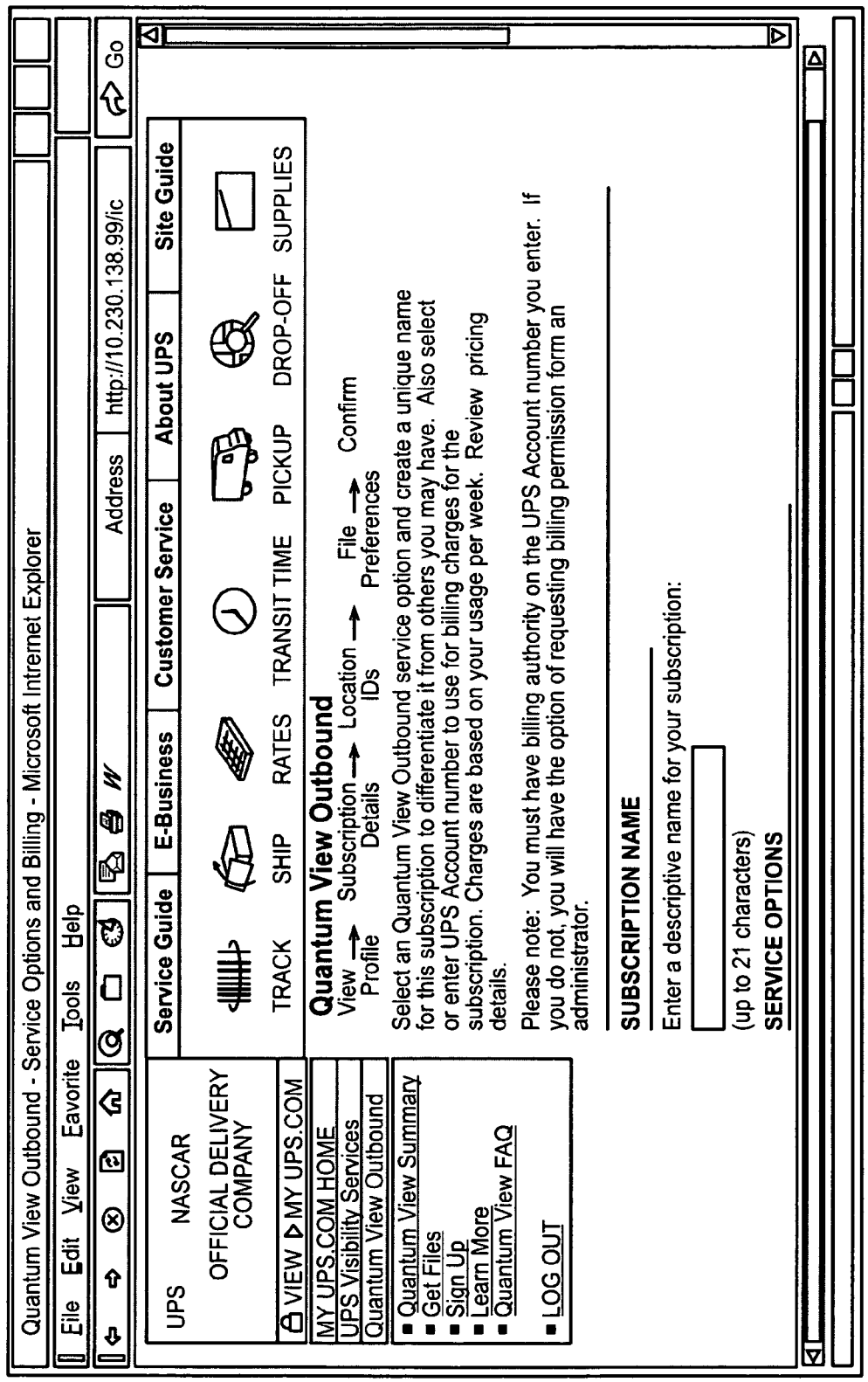

FIGS. 7A-7C show a web page that captures outbound subscription information from a user.

Figure 8H:
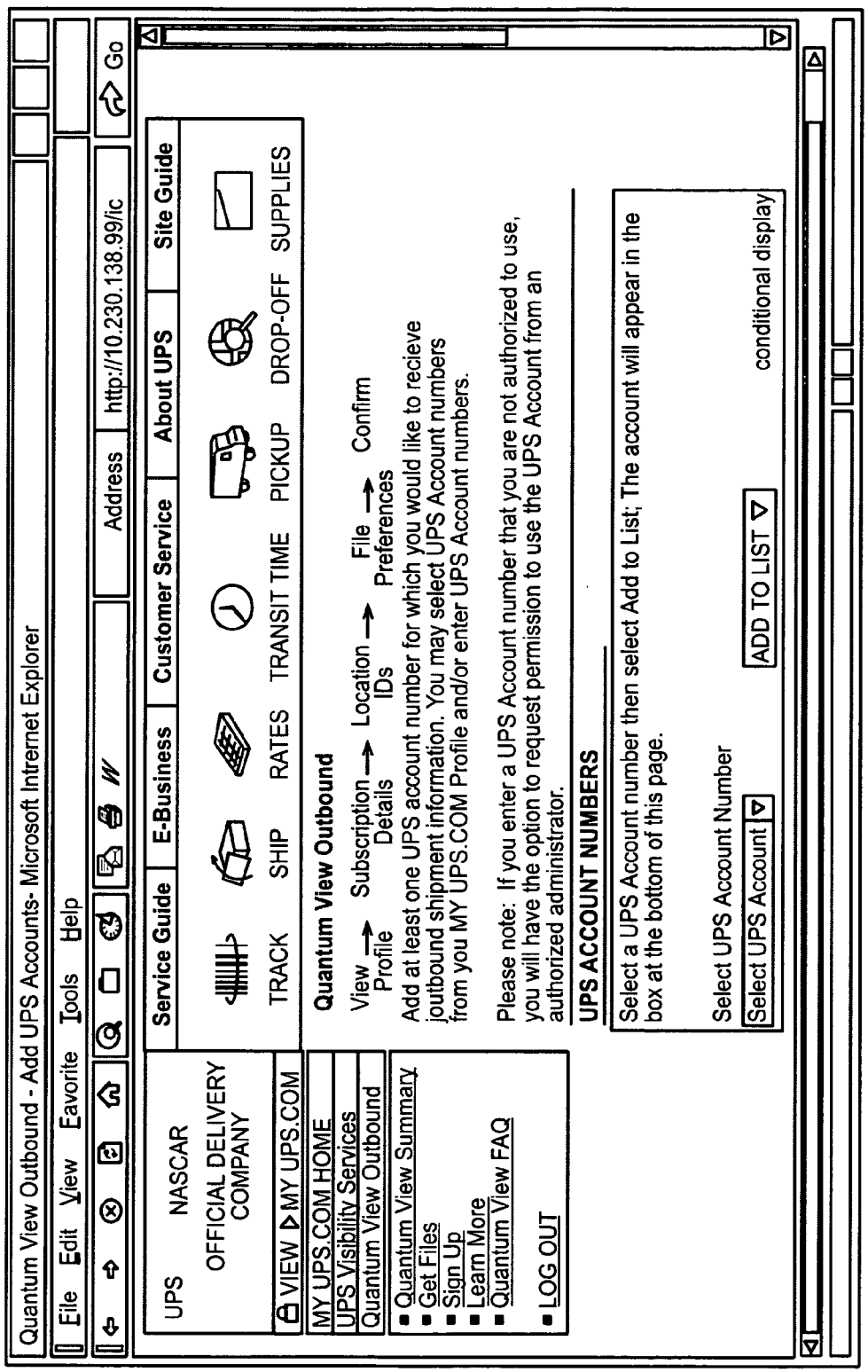

FIGS. 8A and 8B show a web page that illustrates some of the methods of associating a carrier account with an outbound subscription.

Figure 9:
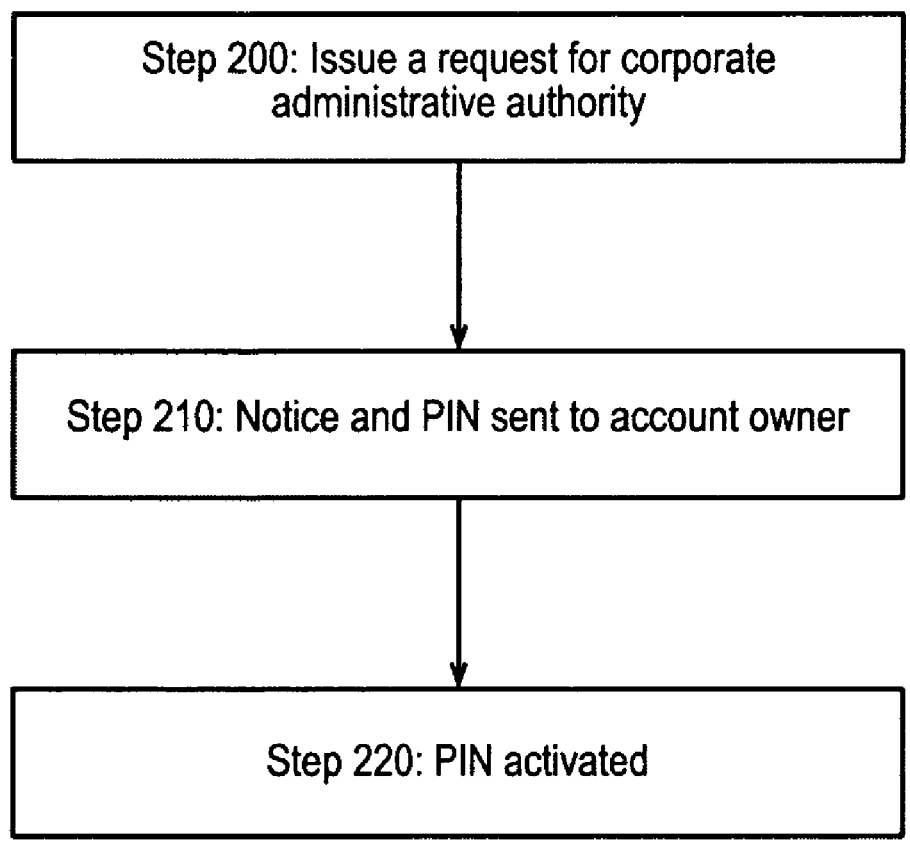

FIG. 9 is a process flow diagram that illustrates the steps used to establish a corporate administrator.

Figure 10:
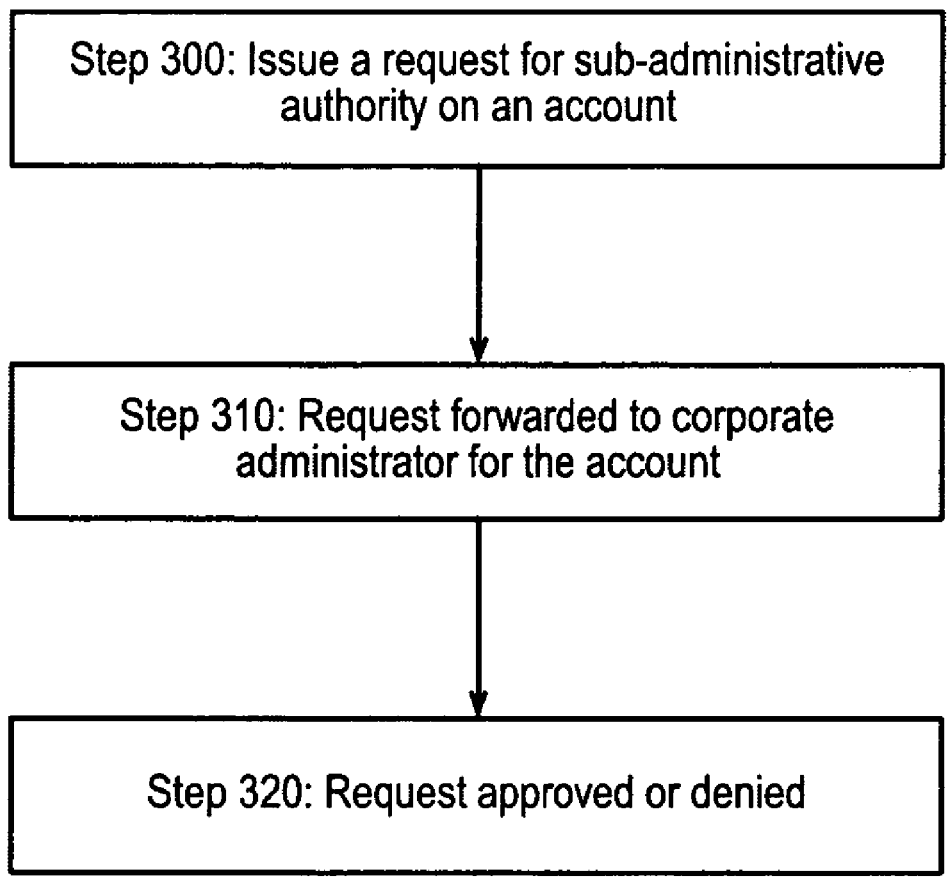

FIG. 10 is a process flow diagram that illustrates the steps used to establish a sub-administrator.

Figure 11:
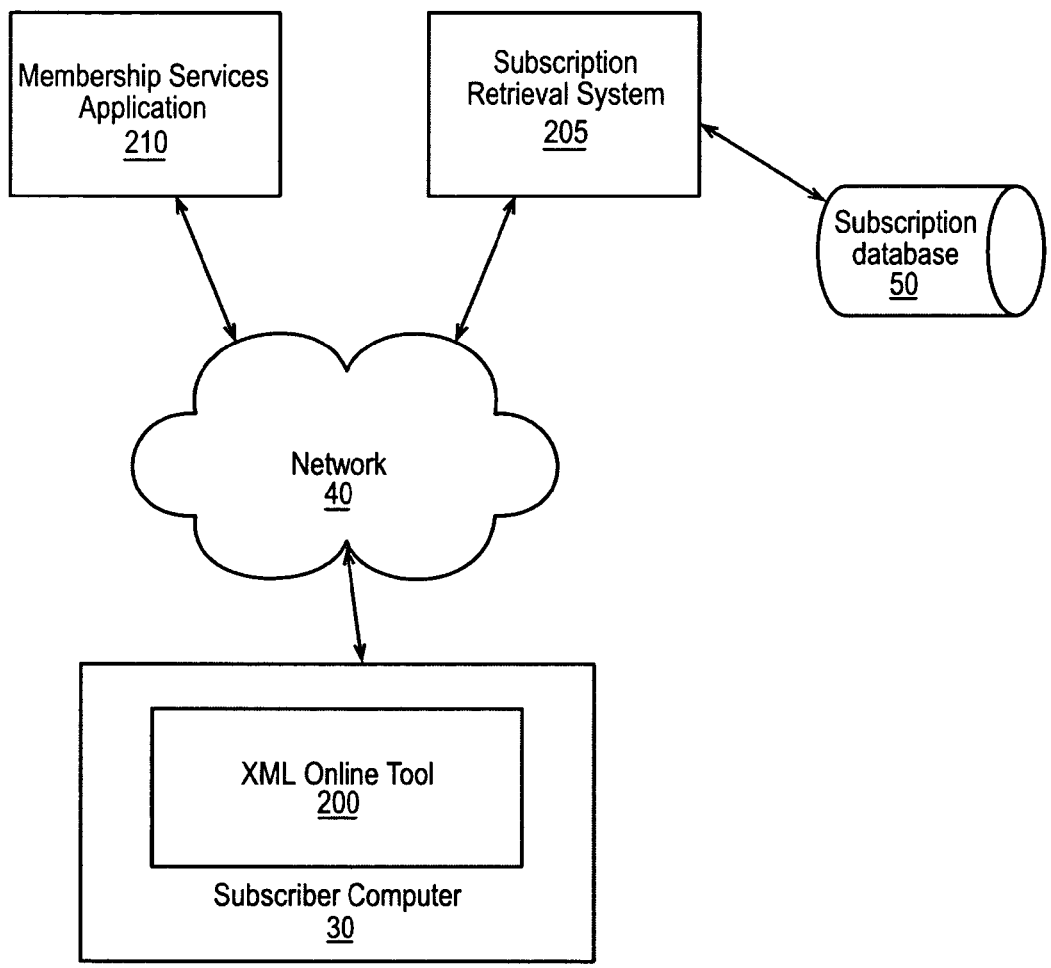

FIG. 11 is a system diagram that shows the communication between an XML online tool and various backend applications of a package visibility system in accordance with an embodiment of the present invention.

Figure 12:
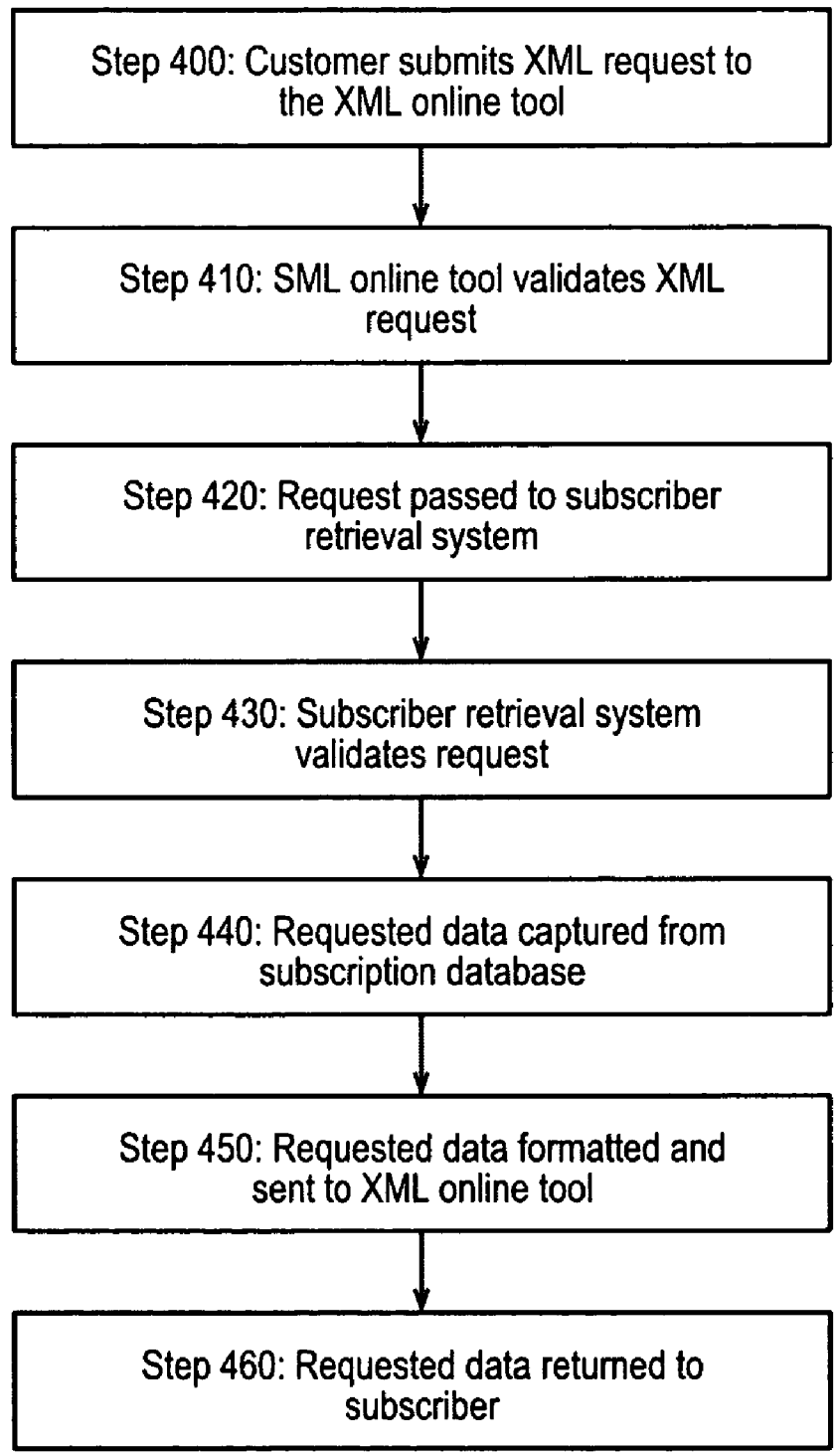

FIG. 12 is a process flow diagram that illustrates how a XML request is processed.

Figure 13:
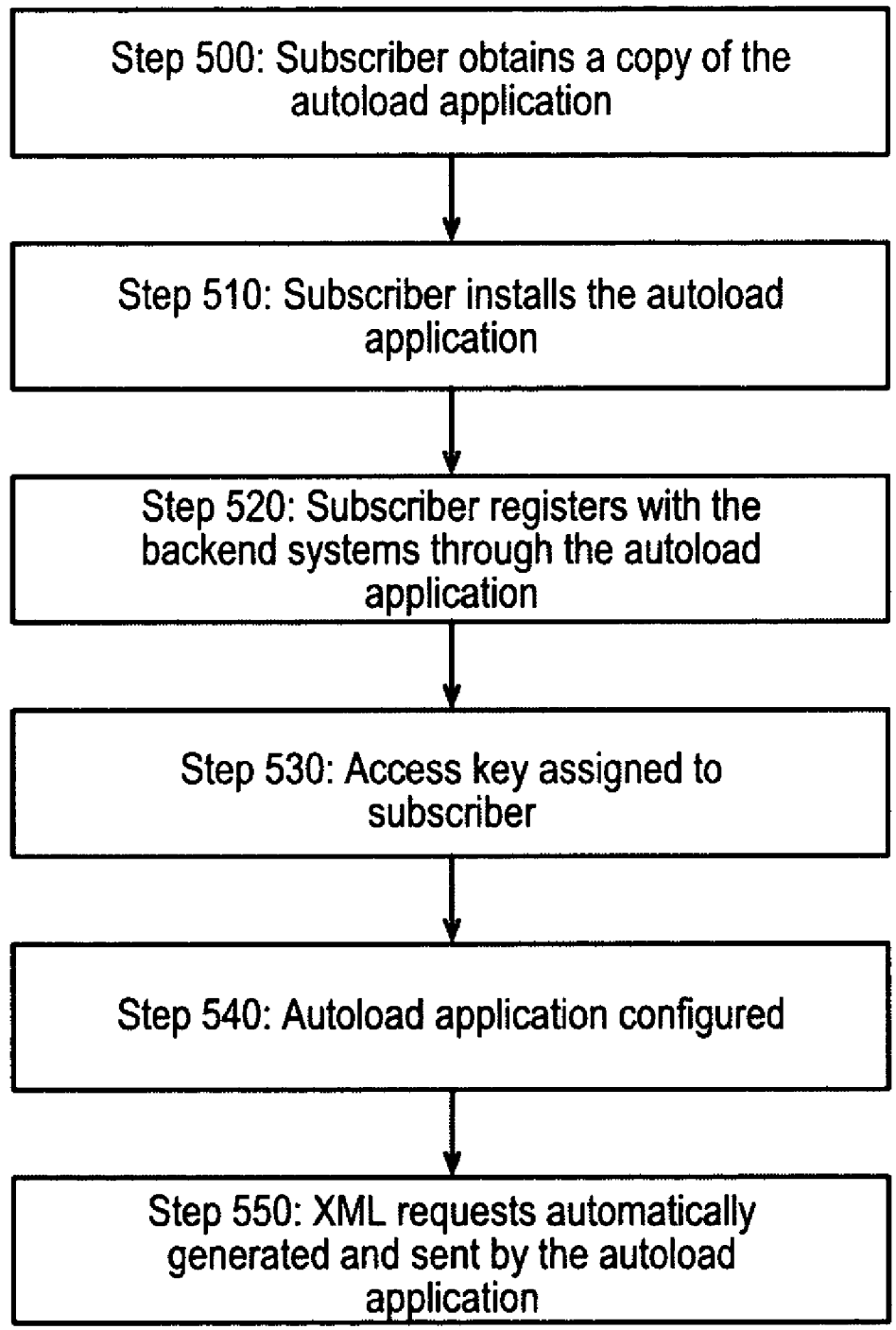

FIG. 13 is a process flow diagram that illustrates the steps used to install and configure an autoload application.

Figure 14:
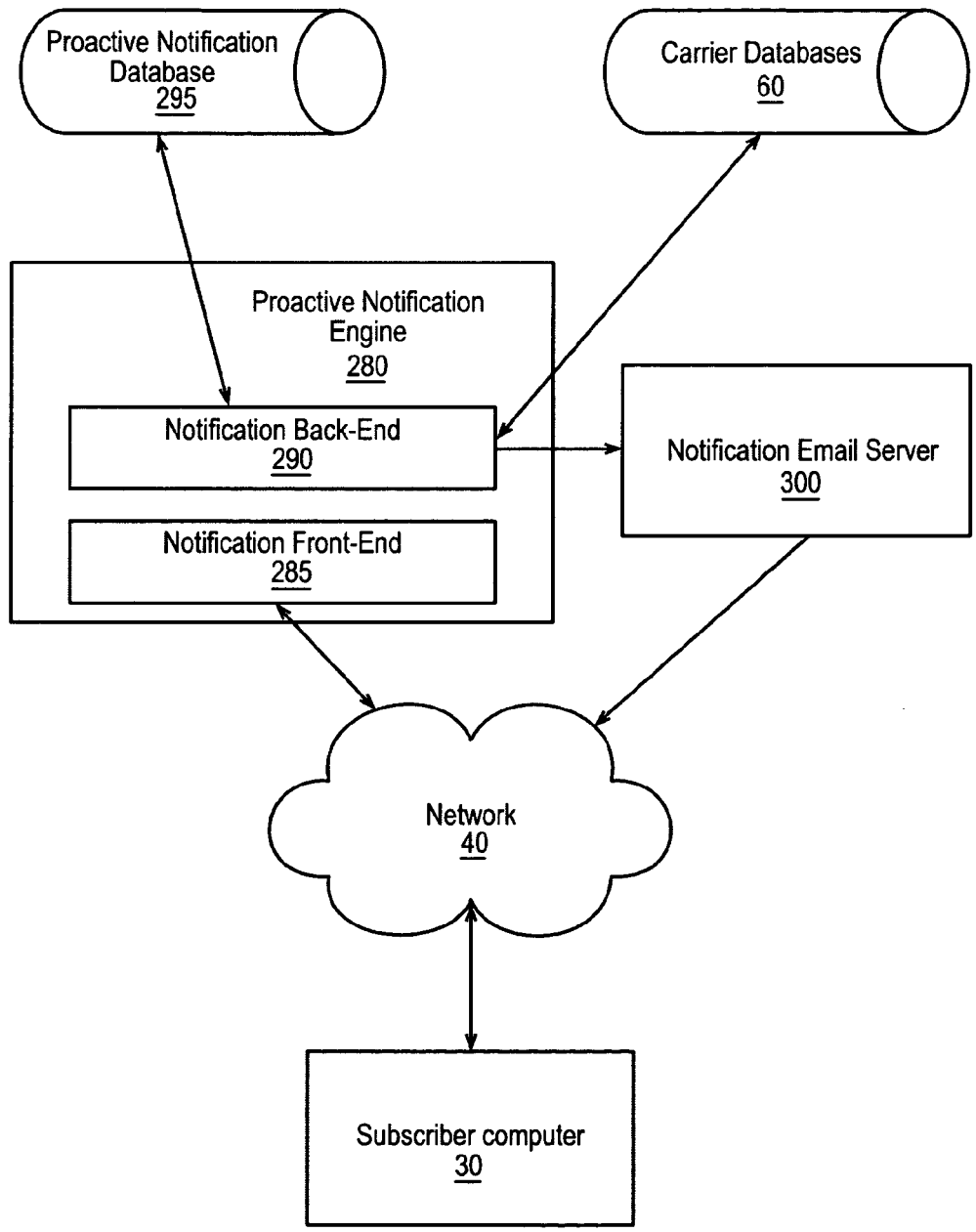

FIG. 14 illustrates a proactive notification tool in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Overview

A inbound and outbound package visibility tracking system 10 (hereafter a package visibility system 10) is described herein that allows a commercial carrier such as UPS to identify those packages that are in transit, either to or from a particular user. In a preferred embodiment, tracking notifications 15 are created by the carrier and delivered to users via one or more notification systems that are described herein. In a preferred embodiment, these notifications 15 provide package level detail (PLD) information 20 to users that includes destination and origin shipment information, and in-transit, exception and delivery data. In other disclosed embodiments, additional notification data is provided to users including, without limitation, delivery date and delivery time, delivery address, reference number, cash-on-delivery (COD) amount and a signature image.

A component of the package visibility system 10 is the location identification 25, hereafter a LID 25. The LID 25 is a unique identifier that designates a specific receiving location for a given user. In various embodiments, the LID is configured such that multiple LIDs may be assigned to a single address. In one embodiment, the LID is comprised of alpha-numeric characters and is not an address or account number. For example, in one embodiment, "ATL678" is an LID assigned to an address near Atlanta, Ga. In this embodiment, other unique LIDs may also be assigned to the same address. In a further embodiment, "ATL678" is assigned to a specific receiving location at its assigned address (e.g., a particular loading dock). In this embodiment, other LIDs may be assigned to other receiving locations (e.g., other loading docks at the same address). In another embodiment, "ATL678" is assigned to a particular department within a company located at the LID's assigned address. In this embodiment, other LIDs may be assigned to other departments within the company. In another embodiment, "ATL678" is assigned to a particular business located at the LID's assigned address. In this embodiment, other LIDs may be assigned to other businesses located at the same address. As described in greater detail below, an LID 25 coupled with user-specific information allows select users to receive package information about the packages that are inbound and/or outbound to the location associated with the LID 25.

The following paragraph describes how the use of a LID provides inbound visibility to a user in accordance with an embodiment of the present invention. The process begins when a user creates a LID 25. Next, the user instructs his or her vendors to include the LID 25 in the shipping information for packages bound for that location. When a package is shipped that contains the LID 25, the carrier captures the PLD 20 data, including the LID 25, and the package visibility system 10 identifies the package as bound for the location associated with the LID 25. As described herein, in a preferred embodiment, packages bound for a given subscriber are identified via the LID 25 and the shipper's UPS account number. On a periodic basis and in a format determined by the user subscription information, the user receives information about the packages inbound to the designated location.

In the context of an outbound shipment, package visibility is obtained by having the shipper include the LID 25 in those packages to be tracked. As the packages move through the carrier system, the packages are scanned and the PLD 20 data is passed to the package visibility system 10. Package information is then formatted and sent to the subscriber in the time intervals and format specified by the subscription. In this way, a subscriber receives periodic updates that identify the location and estimated delivery times of the packages he or she has sent.

The package visibility system 10 further includes an administration function that allows a user known as a corporate administrator to authorize and control access to the subscriber account. In a preferred embodiment, the administration includes multiple levels of control and at least one of a LID administrator, a corporate administrator and a user account administrator. Some or all of these administrators may be able to authorize others to access, use or change a user account. And, in a preferred embodiment, one or more of these administrators has control of security, quality and billing for a user account.

Visibility Package System

FIG. 1 illustrates a high-level block diagram of a visibility package system 10 in accordance with the present invention. A subscriber computer 30 communicates with a package visibility front-end 35 via a network 40. In a preferred embodiment, the subscriber computer accesses the package visibility front-end 35 from a web site on the Internet and documents are passed to a browser application that runs on the subscriber computer 30.

The visibility front-end 35 also communicates with a visibility engine 45, which in turn communicates with one or more subscription databases 50, a package visibility database 55 and one or more carrier databases 60. In a preferred embodiment, the visibility engine 45 resides on the same server as the databases (hereafter the package visibility server 65). But one of ordinary skill in the art will readily recognize that one or more of the databases can reside on separate servers or other computer systems. And these components are described individually; one or more of the applications and/or databases may be divided into separate applications and/or files by function or by other means known in the art.

In a preferred embodiment, the visibility front-end 35 is configured to capture user information from the subscribing computer 30 and is one means by which a tracking notification 25 is provided to subscribers. The visibility engine 45 is a back-end, or server-side application that processes subscriber information, package-tracking information and communicates with carrier and subscriber systems. The subscription database 50 is a database wherein subscriber and account administration data is stored. For purposes of illustration, a single database is shown; however, one of ordinary skill will recognize that user and subscription information may be stored across multiple databases. The package visibility database 55 is a storage area wherein information about inbound and outbound packages is stored. In a preferred embodiment, the data used to generate tracking notifications 15 is taken from the package visibility database 55. The carrier database 60 illustrated in FIG. 1 represents a database in a carrier system that stores PLD 20 information about packages in transit. One of ordinary skill in the art will readily recognize that multiple databases may be used for this function.

Inbound Package Visibility Processes

The following paragraphs describe the process of supplying a subscriber with visibility for packages that are inbound to one or more LIDs 25 associated with that subscription. FIG. 2 is a process flow diagram that illustrates the steps by which a user creates a subscription to receive visibility information about inbound packages.

In step 1, the subscriber logs into the visibility system. Preferably, the subscriber accesses a website and enters the login information from a webpage dedicated to that function. Alternatively, the subscriber may contact a customer service agent who enters the information into a package visibility system 10 in response to instructions from the subscriber. If the subscriber has already registered with the visibility system, the login procedure may require that the subscriber enter a valid user ID and password. If the subscriber is a new user, another step may be required in which the subscriber is prompted for personal and/or billing information.

In a preferred embodiment, a carrier such as UPS operates the package visibility system 10, and subscribers are required to have a valid carrier account before they are granted access to the package visibility system 10. In such case, user information from the pre-existing carrier account may be passed from a carrier user account database to the package visibility system 10 without requiring that the new subscriber re-enter the information. In any case, the necessary subscriber information is captured and stored in the subscription database 50.

In step 2, the subscriber is prompted to create an inbound subscription name. The subscription name should be unique to the subscriber because a single subscriber may have multiple subscriptions. But because the subscription is tied to a particular subscriber, the subscription name does not have to be unique as to all subscribers. As an example, a first subscriber that owns a business with two warehouses may create a first inbound subscription "Inbound for Main Street warehouse," and a second inbound subscription named "Inbound for Maple Avenue warehouse." As long as these subscription names are unique to the first subscriber, it will not matter if a second subscriber has used the same subscription name for another user account.

In step 3, the subscriber is prompted to associate the subscription to a billing account. In a preferred embodiment, this association is required because the package visibility system 10 is a fee-based system. However, the present invention is equally advantageous if provided as a free service, and in such case the step of associating the subscription to a billing account may be omitted.

FIGS. 3A and 3B are screen shots that illustrate a web page that might be used to capture inbound subscription information from a subscriber. In this illustration, the inbound and outbound visibility tracking system 10 is marketed as a Quantum View™ system, with the inbound portion of the system referenced as Quantum View Inbound™. Via this web page, a subscriber enters a subscription name of up to 21 characters in the subscription name field 100. The subscriber has the option of associating the subscription to a billing account by manually entering a billing account into a subscription billing account field 105 or by identifying a billing account from a list of billing accounts associated with the subscriber in a subscription billing account menu 110.

The association of a billing account to an inbound subscription may occur automatically or may require an additional authorization step. In a preferred embodiment, when a user attempts to associate a billing account to a new subscription, the package visibility system 10 automatically generates an authorization request email to an email address associated with the billing account. In some cases, a billing account may have multiple email addresses and/or persons authorized to approve the addition of subscriptions to the account, and the user that is creating the new subscription may be prompted to choose from among the persons authorized to approve the request. One of ordinary skill in the art will recognize that the approval process can occur via email, facsimile, a web page or via other methods that are well-known in the art.

In step 4 of FIG. 2, the user has the option of choosing between two inbound service options: inbound notification and inbound and delivery notification. In a preferred embodiment, the inbound notification service option provides the user with forecasted delivery dates for inbound packages, and exception updates should the delivery date change. This service also provides other information, including ship date, scheduled day of delivery (SDD), exception updates (including delivery exceptions) where rescheduled day of delivery (RDD) is calculated, shipped from and shipped to address information and LID 25. In a preferred embodiment, the inbound and delivery notification service option includes all of the features of the inbound notification service option, plus delivery information about packages shipped to and received from a LID 25, including delivery date and time, signature, COD amount, reference numbers, and full delivery address. In a preferred embodiment, the shipping information provided to fulfill these services is provided via one or more carrier applications or via other methods that are known in the art. The relevant information is then captured by the visibility engine and passed to the subscriber.

In step 5, the user assigns one or more LIDs 25 to the subscription. In a preferred embodiment, LIDs 25 are associated with a subscription in one of three ways: a new LID 25 can be created for the subscription, a user can select from a list of existing LIDs 25, or the user can manually enter the LID 25. The process of creating a new LID 25 is described in greater detail below; therefore, the following paragraphs will describe the process of adding existing LIDs 25 to a new inbound subscription.

FIGS. 4A and 4B are screen shots that illustrate a web page that might be used to prompt a user to associate one or more LIDs 25 with an inbound subscription. In this illustration, the user has the ability to link to another web page to create a new LID 25, select an existing LID 25 from a LID pull-down menu 115, or to manually enter a LID 25. A list of LIDs associated with the subscription is shown in FIG. 4B, and the subscriber has the option of adding and/or deleting LIDs 25 from this list. In a preferred embodiment, at least one administrator is associated with each LID 25 and must approve the request before a LID 25 is added to the subscription. The request to add the LID 25 to a subscription and the approval and/or denial of the request by the LID administrator 120 may occur via email, facsimile, web page or via other communications means that are well known in the art. In alternative embodiments, an authorization code or password may be required before a LID 25 can be associated with a subscription. In still another embodiment, certain users may be pre-approved to associate certain LIDs 25 with new subscriptions. Other means of maintaining administrative security and control are known in the art and can be used with the present invention, and additional detail about the administrative hierarchy is set forth below.

In step 6 of FIG. 2, the user is prompted to choose a format for the inbound notification subscription. In a preferred embodiment, inbound notification files are formatted as a comma-separated value, a flat file, or an XML file. But other file formats are known in the art and are equally advantageous with the present invention. In one embodiment of the present invention, the user is prompted for an email address in step 6 and the appropriately formatted notification file is sent to the user as an email attachment. In another embodiment, inbound notification files must be downloaded from a web page or other location and the email address is used to notify the user when the files are ready for pickup. Other methods of delivering inbound notification data are known in the art and are discussed below, and any of these methods can be selected and/or configured by the user at step 6 in the subscription process.

The following paragraphs describe the process of creating a new LID 25. FIG. 5 is a process flow diagram that illustrates the steps by which a user creates a new LID 25 in accordance with a preferred embodiment of the present invention.

In step 10, the user is prompted to enter a new LID 25 using a combination of numbers and/or letters. In a preferred embodiment, the LID 25 entered by the user should be a unique identifier that will be used by the package visibility system 10 to report shipment information. The user is also prompted to provide a description of the LID 25 and a receiving location address associated with that LID 25.

In a preferred embodiment, when a user creates a new LID 25, the user becomes a LID administrator 120 for that LID 25, and receives the ability to approve or deny requests from other users to use that LID 25. Thus, when a user creates a new LID 25 the user must first agree to a click-thru license agreement that requires that the user accept the terms and conditions associated with the role of LID administrator 120 (step 15). In an alternative embodiment, the creator of the LID 25 does not automatically assume the responsibilities of LID administrator 120 and a single LID administrator 120 may be assigned to any LIDs created by a user or group of users. In addition, the license agreement associated with the LID administrator 120 may be entered into offline or via other means known in the art.

Step 20 of the LID-creation process requires the user to associate one or more vendor account numbers to the LID 25. The user may associate as many or as few vendor account numbers to the LID 25 as desired. In a preferred embodiment, only those packages from vendors whose accounts are associated with a LID 25 are reported in the inbound notification reports. Allowing the LID administrator 25 to limit those vendor accounts that are associated with a particular LID 25 thus provides security and control to the inbound notification process. For example, users do not receive inbound notifications, and are not charged, when unauthorized vendors or other entities include a LID 25 in packages. In a preferred embodiment, only those authorized vendors that include the LID information in packages that are bound for the receiving location associated with the LID 25 are included in the inbound notification data.

In step 25, the user has created a new LID 25 and instructs the vendors to include the LID 25 in packages they send to the receiving location associated with the LID 25. In one embodiment, a vendor email address is associated with the vendor account number and the vendor receives an email when the vendor account number is added to a LID 25. In an alternative embodiment, an additional step is included in the LID creation process that allows the user to customize an email to the vendors that instructs them regarding use of the new LID 25. One of ordinary skill in the art will readily recognize that other methods of communicating instructions to the vendor are well known in the art and will be equally advantageous with the present invention. Thus, in another embodiment, the communication of LID 25 information from a subscriber to his or her vendors occurs outside the package visibility system 10.

In step 30, the vendors add the new LID 25 to the shipping information for packages bound to the receiving location associated with the LID 25. Depending on the vendor, the LID 25 information may be manually entered or may be included in a vendor shipping system and automatically included in the PLD 20 for each package bound for the receiving location. In a preferred embodiment, the package visibility system 10 is operated by a carrier, and the carrier reserves a specific field for LID data. When a vendor ships a package to a receiving location associated with a LID 25 and includes the LID 25 in the shipping information, carrier backend systems recognize the LID 25 data and pass the package information to the visibility engine 45. The package visibility engine 45 identifies, assembles and updates package information for those packages in the carrier system that have LID data in the shipping information. This information is then collected and reported to subscribers, using notification methods described below, in accordance with the particular subscription requirements.

Outbound Package Visibility Processes

The following paragraphs describe the process of supplying a user with visibility for packages that are sent from one or more user account numbers. FIG. 6 is a process flow diagram that illustrates the steps by which a user creates a subscription to receive visibility information about outbound packages.

In step 100, the user logs on to the package visibility system 10. Preferably the user/subscriber accesses a website and enters the login information from a webpage dedicated to that function. Alternatively, the subscriber may contact a customer service representative who enters the information into a package visibility system 10 in response to instructions from the subscriber. If the subscriber has already registered with the visibility system, the login procedure may require that the user enter a valid user ID and password. If the subscribe is a new user, another step may be required in which the user is prompted for personal and/or billing information.

In a preferred embodiment, a carrier such as UPS operates the package visibility system 10, and users are required to have a valid carrier account before they are granted access to the package visibility system 10. In such case, user information from the pre-existing carrier account may be passed from a carrier user account database to the package visibility system 10 without requiring that the new subscriber re-enter the information. In any case, the necessary subscriber information is captured and stored in the subscription database 50.

In step 110, the subscriber is prompted to create an outbound subscription name. The outbound subscription name should be unique to the subscriber because a single subscriber may have multiple subscriptions. But as was the case with the inbound subscription name, the outbound subscription is tied to a particular subscriber, and the outbound subscription name does not have to be unique as to all subscribers.

In step 120, the subscriber is prompted to choose between the available outbound subscription options, including: outbound notification, delivery notification and exception notification. In a preferred embodiment, the outbound notification service option provides complete information about outbound packages, including significant supply chain status updates through delivery with ship date, exception, and delivery detail. Moreover, in a preferred embodiment, subscribers can add other data elements associated with the shipped packages to the notification report. In a preferred embodiment, the delivery notification service option provides delivery details and manifest information, including ship date, date and time of delivery, reference number, full delivery address, COD amount collected, and other delivery information, which again may be tailored to the needs of the individual subscriber. Finally, the exception notification service option provides information about packages shipped that do not make the scheduled date of delivery. In a preferred embodiment, subscribers that elect to receive the exception notification option receive exception status updates and forecasts for rescheduled dates of delivery. In a preferred embodiment, the shipping information provided to fulfill these services is provided via one or more carrier applications or via other methods that are known in the art. The relevant information is then captured by the visibility engine and passed to the subscriber.

In step 130, the subscriber is prompted to associate the outbound subscription to a billing account. In a preferred embodiment, this association is required because the package visibility system 10 is a fee-based system. However, the present invention is equally advantageous if provided as a free service, and in such case the step of associating the outbound subscription to a billing account may be omitted.

FIGS. 7A-7C are screen shots that illustrate a web page that might be used to capture outbound subscription information from a user. In this illustration, the inbound and outbound visibility tracking system 10 is marketed as a Quantum View™ system, with the outbound portion of the system referenced as Quantum View Outbound™. Via this web page, a user enters a subscription name of up to 21 characters in the subscription name field 100. The user has the option of associating the subscription to a billing account by manually entering a billing account into a subscription billing account field 105 or by identifying a billing account from a list of billing accounts associated with the user in a subscription billing account menu 110.

The association of a billing account to an outbound subscription may occur automatically or may require an additional authorization step. In a preferred embodiment, when a user attempts to associate a billing account to a new subscription, the package visibility system 10 automatically generates an authorization request email to an email address associated with the billing account. In some cases, a billing account may have multiple email addresses and/or persons authorized to approve the addition of subscriptions to the account, and the user that is creating the new subscription may be prompted to choose from among the persons authorized to approve the request. One of ordinary skill in the art will recognize that the approval process can occur via email, facsimile, a web page or via other methods that are well-known in the art.

In step 140 of FIG. 6, the user is prompted to enter one or more carrier account numbers 125 that will be used for the outbound notification service. In a preferred embodiment, carrier account numbers 125 are account numbers used by carrier customers when shipping packages via the carrier system. When a package is shipped using a carrier account number 125 that is associated with an outbound subscription, information about the package is identified, assembled and updated by the visibility engine 45. The package information is then collected and using one or more of the notification methods described below in accordance with requirements of the outbound subscription.

FIGS. 8A and 8B are screen shots that illustrate some of the ways in which carrier account numbers 125 are associated with an outbound subscription. One option available to users is to select from a pull down menu of carrier account numbers 125. In a preferred embodiment, the pull down menu shows those carrier account numbers 125 associated with the user ID of the person who is creating the outbound subscription. Alternatively, the user may enter a carrier account number 125 in an account number field. If the user manually enters the carrier account number 125, a validation routine will confirm that the account numbered entered is a valid carrier account. In addition, if the user is not authorized to use the entered carrier account number, the system 10 generates an email request for authorization and sends the request to the email address associated with the carrier account that the user entered.

Returning to FIG. 6, in step 150 the user is prompted to choose a format for the outbound notification subscription. In a preferred embodiment, format choices for the outbound notification file include a comma-separated value file, a flat file, or an XML file. Other file formats are known in the art and are equally advantageous with the present invention. In one embodiment of the present invention, the user is prompted for an email address and the appropriately formatted notification file is sent to the user as an email attachment. In another embodiment, outbound notification files are downloaded from a web page or other location and the email address is used to notify the user when the files are ready for download. Other methods of delivering outbound notification data are known in the art and are discussed below, and any of these methods can be selected and/or configured by the user at step 140 in the outbound subscription process.

Establishing a Corporate Administrator

The following paragraphs describe the processes by which administrators are established using the package visibility system 10. In a preferred embodiment, administrators have control over user accounts and information to insure that only authorized users are able to subscribe and request billing charges for user accounts.

A first level of administration for a user account is the corporate administrator 175, which in a preferred embodiment is authorized to create their own administrative requests, approve or deny requests made by other users, request additional services, receive email notifications of pending requests, block future administrative requests by individual users, and delegate authority to one or more sub-administrators 180. FIG. 9 is a high-level process flow diagram that illustrates the steps required to establish a corporate administrator 175 in accordance with an embodiment of the present invention. In general, the process requires that a user request for corporate administrative authority be confirmed by the account owner. As used herein, the term "account owner" refers to a user that has control over the account or is authorized to delegate administrative power for the account.

In step 200, the user issues a request to receive corporate administrative authority for a user account. In a preferred embodiment, the user is prompted to identify a user account for which the user is requesting authority and an email is sent to the account owner. The account owner may approve or deny the request. If approval is granted, the process proceeds to step 210, and if the user's request is denied, the package visibility system 10 notifies the user of the denial via email, a web page document or via other means of notification that are known in the art.

In step 210, the account owner receives a notification that a request for administrative authority has been made. The notification may be made via email, facsimile, U.S. mail, facsimile, webpage or via other communication means that are well known in the art. In a preferred embodiment, the notification includes a PIN that is generated by the package visibility system 10 in response to the request for corporate administrative authority.

In step 220, the PIN is activated. If the account owner is also the user that has requested corporate administrative authority, the account owner can log onto the package visibility system 10 and activate the PIN. But if corporate administrator 175 is not the account owner, the account owner is responsible for forwarding the PIN to the user that is receiving corporate administrative authority. In such case, one or both of the account owner and corporate administrator 175 may be required to login to the visibility system 10 to activate the PIN. One of ordinary skill, however, will recognize that alternative processes for granting administrative authority can be used with the present invention. In an alternative embodiment, for example, an account owner receives a notification that a user has requested corporate administrative authority. To approve the request, the account owner logs into the package visibility system 10. Upon account owner approval, a PIN is generated and sent directly to the new corporate administrator 175. In some embodiments, both the account owner and the corporate administrator 175 are required to activate the PIN, while in other embodiments, only one of the account owner and corporate administrator 175 are needed to activate the PIN. In still another alternative embodiment, the corporate administrator 175 will login to an administrative login screen of the package visibility system 10 to activate a PIN, and the initial login may be required to occur within a predetermined time to insure that the proper party received the PIN. Activation of a PIN can occur via a variety of methods that are well known in the art. In a preferred embodiment, the activation of the PIN occurs upon activation of a hypertext link to a PIN uniform resource locator (URL).

Another level of administration available in a preferred embodiment of the present invention is the sub-administrator 180. FIG. 10 is a high-level process flow diagram that illustrates the steps required to establish a sub-administrator 180 in accordance with an embodiment of the present invention. In step 300, a user issues a request to receive sub-administrator authority. In a preferred embodiment, a user can request two types of sub-administrator authority 180, including the authorization to approve a subscription-billing request, and the authorization to access the shipping information for an account. Additional types of sub-administrator authority will be apparent to one of ordinary skill in the art.

In step 310, the user request for sub-administrator authority is sent to the corporate administrator 175. In a preferred embodiment, the corporate administrator 175 of an account has the authority to approve or deny requests for sub-administrator authority. In alternative embodiments, the account owner must approve or deny any request for sub-administrator authority, or the account owner and corporate administrator 175 must jointly approve of the sub-administrator request. In yet another alternative embodiment, the corporate administrator 175 and/or the account owner can give a sub-administrator 180 the power to approve or deny a request for sub-administrator authorization.

In step 320, the user request for sub-administrator authority is approved or denied. In a preferred embodiment, the approval and/or denial of a sub-administrator request is sent to the user via email. Alternatively, the user's profile in the package visibility system 10 is updated to reflect the approval or denial of the request and the user must check his or her profile to determine the status of the request. One of ordinary skill in the art will readily recognize that other methods of providing a status of the request are known in the art and may be used with the present invention. In a preferred embodiment, the person or persons with authority to approve and deny administrative requests also have the ability to comment on the reason for approval and/or denial. This additional information can be made available to the user that initiated the request either via email or via the user profile. For example, if user request for administrative authority is denied, the user may be able to click on a link in his or her profile to obtain additional information as to the reason the request was denied.

Another level of administration available in a preferred embodiment of the present invention is the LID administrator 120. As discussed above, one role of the LID administrator 120 is to approve and/or deny the use of or access to LIDs in inbound subscriptions. While a single LID administrator 120 is assigned to each LID 25, multiple LIDs 25 may be assigned to a single LID administrator 120. In a preferred embodiment, the user that creates a LID 25 automatically assumes the responsibilities of LID administrator 120. In an alternative embodiment, the account owner, the corporate administrator 175, or one or more sub-administrators 180 assume the role of LID administrator 120. Thus, in this alternative embodiment, at least one administrator must approve the use of a LID 25 with an inbound subscription.

Notification Systems

In a preferred embodiment, the present invention encompasses a variety of notification methods and systems. The package visibility system 10 provides users, on a subscription basis, the ability to receive a subset of tracking information specific to packages that are inbound to or outbound from the user. The information that is available to the user includes, but is not limited to delivery information, exception information, manifest and origin information. Each of these is discussed in greater detail below.

In a preferred embodiment, a user has the ability to subscribe to visibility system 10 of the present invention via a website on the Internet. The process may be a fee-based subscription and the user has the option of subscribing to a subset of the offered services. In one embodiment, a user has the option of subscribing to three outbound services, exception notification, outbound notification, and delivery notification, and two inbound services, inbound notification and inbound and delivery notification. If the user subscribes to more than one of the subscription-based services, the user may be prompted or may be assigned a subscription name that corresponds to the service. In addition, as part of the subscription process, the user is prompted to specify the file format in which the information will be sent to the user. In one embodiment, a user must specify a single file format that will be used for all of the subscription services. But in alternative embodiments, users may select different file formats for different services. For purposes of illustration, the following paragraphs describe a process wherein a user requests an XML file format. XML formats are well known in the art, but one of ordinary skill will recognize that multiple other file formats are known that can be used with the present invention.

Outbound visibility services provide a method for subscribing users to obtain a data message on a request basis that contains package information for one or more carrier account numbers. In one embodiment, outbound visibility services consist of three services that subscribers can specify during the subscription process: outbound notification, exception notification and delivery notification. In general, outbound notification provides information about packages that are outbound from the subscribing user, including but not limited to supply chain status updates through delivery with ship date, exception and delivery detail. Delivery notification provides delivery details and manifest information, including ship date, date and time of delivery, reference number, full delivery address and COD amount collected. Exception notification provides information about packages that will not make the scheduled date of delivery, and in a preferred embodiment includes a re-scheduled date of delivery.

Inbound visibility services provide a method for subscribers to obtain a data message on a request basis that contains shipment information for one or more UPS account numbers. In one embodiment, inbound visibility services comprise two services that a subscribing user may specify during a subscription process: inbound notification and inbound and delivery notification. Inbound notification provides forecasted delivery dates for inbound packages, as well as any exception updates that could potentially change the delivery dates. In a preferred embodiment, the service also provides other information, including ship date, scheduled date of delivery, exception updates where rescheduled day of delivery is calculated, shipped from and shipped to address information and LID 25. Inbound and delivery notification includes all of these features and additionally includes delivery information about packages shipped to and received at the LID 25, including delivery date and time, signature, COD amount, reference numbers, and full delivery address.

The Online File Download Tool

FIG. 11 is a system diagram that shows the communication between an online file download tool (hereafter the XML online tool 200) and the various backend applications of the visibility system 10 in accordance with an embodiment of the present invention. The XML online tool 200 serves as an application programming interface between a customer and the backend systems. XML is used herein because it is a common file format that is known in the art, but one of ordinary skill will readily recognize that other file formats can be used with the present invention.

In this illustration, a subscription retrieval system 205 is a backend application in the package visibility system 10 that communicates via a network 40 with the XML online tool 200 to process and manage the listing and retrieval of subscription files from a subscription database 50. Another backend system referred to herein as a membership services application 210 communicates with the XML online tool 200 to provide security and access rights and privileges to the customer.

FIG. 12 is a process flow that illustrates how a customer XML request is processed. In step 400, the customer submits an XML request to the XML online tool 200. In step 410, the XML online tool 200 validates the XML request. The validation process validates the customer's rights to access the XML online tool 200 and its associated version. In a preferred embodiment, the customer must submit a valid user ID, password and access license number, and this information is passed to the membership services application 210 via the network 40. If the customer is appropriately authorized, the process continues to step 420 where the XML request is processed. But if validation process fails because the customer has not submitted a valid user ID or password, or because the customer is not authorized to perform the requested operation, the XML online tool 200 returns an error code that identifies the problem.

In step 420, the XML online tool 200 passes the XML request to the subscriber retrieval system 205 via the network 40, and in step 430 the subscriber retrieval system 205 validates the request. In a preferred embodiment, the subscriber retrieval system 205 validates the format of the data that comprises the XML request. To illustrate, if a subscription name or filename is passed in the XML request, the subscriber retrieval system 205 confirms that the subscription and/or filename received have the proper data length and character type.

The XML request submitted by a customer may include different types of information. For example, a customer may request all of the unread data (i.e. data that has not previously been provided to the customer) for a particular subscriber identifier. Alternatively, a customer may submit a subscriber identifier and at least one subscription, in which case the customer will receive the unread data associated with the identified subscription(s). As another example, the XML request may include a subscriber identifier, subscription name, and at least one filename. In such case, the subscriber retrieval system 205 captures all the data (read and unread) for the identified subscription and formats and returns the data to the identified filename. In still another example, the customer may request all of the data (read and unread) for a subscriber identifier within a specified date and time range. And in yet another example, the customer may request all data for a subscriber identifier for a particular subscription name within a specified data and time range. These are just a few of the types of data retrieval requests that a customer may submit via the XML tool 200. One of ordinary skill will readily recognize that other types of XML requests may be submitted using the described system and processes.

In step 440 the subscriber retrieval system 205 communicates with the subscription database 50 and captures the data identified in the customer's XML request. In step 450, the subscriber retrieval system 205 formats the data and sends it to the XML online tool 200 via the network 40. Finally, in step 460 the XML online tool 200 returns an appropriately formatted response to the customer.

Autoload

Another aspect of the present invention is an automated access and file download application 250 (hereafter an autoload application 250) and method that allows a customer to schedule automatic downloads of their subscriber data. An autoload application 250 is installed on a customer computer system, which communicates with the XML online tool 200 and generates XML requests according to user-defined parameters. According to a customer-defined schedule, the autoload application 250 automatically generates the customer's XML request and retrieves and stores the subscriber data in the location and format specified by the customer's inbound and/or outbound subscription.

FIG. 13 is a process flow diagram that illustrates the steps to install and configure an autoload application 250. In step 500, a customer obtains a copy of the autoload application 250. In a preferred embodiment, the customer downloads the autoload application 250 from a provider site. Alternatively, the autoload application 250 may be provided to the customer on a CD-ROM or other electronic media, or by other file transfer means that are known in the art.

In step 510 the customer installs the autoload application 250 by executing an installation executable file. Once the autoload application 250 is installed, the customer is prompted to enter a user ID and password. In step 520, the user ID and password are passed to the XML online tool 200 and are forwarded via the network 40 to the membership services application 210. In a preferred embodiment, the membership services application 210 controls the granting of access rights to the customer. As part of the installation and configuration of the autoload application 250, the membership services application 210 requires that the customer agree to one or more license agreements relating to the use and access to the subscriber data. In step 530, the customer agrees to the one or more access license agreements, and an access key is assigned to the customer. In one embodiment, the access key assigned to the customer is automatically embedded in all communications between the autoload application 250 and the customer. Alternatively, the customer may be prompted to re-enter the access key if the automated access application 250 is configured or re-configured.

In step 540, the customer is prompted to configure the autoload application 250. In a preferred embodiment, configuration options include the ability to one or more subscription names; to specify the file format (including but not limited to XML, flat file or comma separated value); a frequency of data updates (i.e. one or more days of the week and/or specified times on the scheduled days); and a target location where the files should be sent. In addition, the customer may specify the types of records to be automatically downloaded. In this way, the customer may customize the download to his or her specific needs. One of ordinary skill in the art will readily recognize that there are many ways to customize a file download scheduling application in accordance with the present invention.

In step 550, once the autoload application 250 is installed and configured it automatically generates and submits the XML requests for the customer according to the schedule established by the customer. In this way, the customer receives automatic updates of its subscriber data without requiring that the customer manually submit XML requests using the XML online tool 200 or manually connect to and download subscriber data from a website. If the autoload application 250 encounters a problem while attempting to send the XML request and download the subscriber data an error message is displayed. In the event of a network problem, the autoload application 250 attempts to connect to the back-end systems three or more times. And after the last attempt an error message is displayed if the autoload application 250 is still unable to connect. Also in a preferred embodiment, the autoload application 250 compares the active status of each subscription identified by the customer, and returns only subscriber data from active subscriptions. If the autoload application 250 determines that one or more of the requested subscriptions is not active, the autoload application 250 returns an error code indicating the inactive status of the requested subscription. Similarly, in a preferred embodiment, the autoload application 250 returns additional messages if a subscription status changes from an inactive or suspended status to an active status.

Proactive Notification Tool

Another aspect of the present invention is a notification system and method for proactive notification of a change in status of one or more packages. In a preferred embodiment, a proactive notification tool 275 provides customers with the ability to request notification of key events in the progress of a package or shipment, including but not limited to: shipment, exception (delay), and delivery. Using the proactive notification tool 275, customers are notified proactively of any of these events and/or can request that notification be sent to others.

In contrast to the above-described systems, a proactive notification tool 275 uses package tracking numbers rather than customer reference numbers to identify the information to be captured. Unlike users of the above-described notification systems and methods, users of the proactive notification tool 275 do not require that the user obtain a service subscription. While the proactive notification tool 275 can operate as a fee-based service, the tool allows charges to be based on the notification services requested per package tracking number per request.

Notifications may be requested for one or more packages. In a preferred embodiment, the types of notifications available to subscribing customers include ship notification, exception notification and delivery notification. Ship notification is an email notification message to one or more individuals informing the requestor's contact list that the carrier has received a package or shipment. Exception notification is an email notification message to one or more individuals when the scheduled day of delivery has changed such that the day of delivery is re-scheduled. Delivery notification is an email notification message to one or more individuals regarding the delivery, including date, time and name of recipient, of a package or shipment.

FIG. 14 illustrates a proactive notification tool 275 in accordance with an embodiment of the present invention. A customer communicates with a proactive notification engine 280 via the network 40. The notification engine 280 is separated into front-end and backend applications. In operation, the customer contacts the proactive notification front-end 285 via the network 40 using a web browser. The front-end application 285 allows the customer to request the proactive notification service and captures the information necessary to process the request (hereafter the notification request data). The front-end application 285 captures the notification request data from the customer and validates the data in the request. In a preferred embodiment, the front-end application 285 prompts the customer to identify the package tracking number or numbers for which notification will be performed. For each of the requested package tracking numbers, the customer is asked to identify a type of notification requested (i.e. shipment, exception and/or delivery) and an email address (or other notification method known in the art) that will be used for notification purposes. In addition, if the proactive notification process is fee based, the front-end application 285 captures billing and/or payment information. In one embodiment, the billing process (i.e. the communication with billing and/or payment systems) is handled by the front-end application 285. In an alternative embodiment, the billing information is captured by the front-end application 285 and passed to the backend application 290, which handles the billing and/or payment processes.

The proactive notification backend application 290 receives the notification request data captured by the front-end application 285, and stores the data in a proactive notification database 295. On a periodic basis or on a scheduled specified by the customer, the backend application 290 queries one or more carrier tracking databases 60 with the package tracking number. Each time that a match occurs throughout the package life cycle, based on service, tracking number, and/or status change type, the backend application 290 creates an object for the notification email server 300. In a preferred embodiment, the object is then passed to the notification email server 300 via a message queue or other messaging middleware that is known in the art. The notification email server 300 receives the object from the backend application 290 and extracts the notification data from the object. The data is then mapped to an appropriate proactive notification message and is sent to the email recipient (or recipients) specified in the object.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A package tracking system that provides visibility for inbound packages, comprising:
    a carrier database configured to store package information about one or more packages that are in transit in a carrier system;
    a visibility engine configured to communicate with said carrier database, said visibility engine configured to review said package information and to identify a package that is inbound to a location associated with a user, who is to receive said package; and
    a user computer configured to communicate with said visibility engine via a network, said user computer configured to:
        receive shipping information associated with said inbound package,
        enable said user, who is to receive said package, to create a unique location identifier and associate said unique location identifier with said location, wherein said unique location identifier is not an address associated with said location, is not an account number associated with said location, and is not a carrier tracking number; and
        enable said user to assign multiple unique location identifiers to a single address;
    wherein in order to identify a package that is inbound to said location, said visibility engine is configured to identify a package having said unique location identifier associated with said location included in the package information associated with the package.

2. The system of claim 1, wherein said package information stored in said carrier database includes package level detail for said packages.

3. The system of claim 1, wherein said user computer is further configured to initiate a request for inbound package tracking through said visibility engine.

4. The system of claim 1, wherein said user computer is further configured to request that said visibility engine send said shipping information in a specified format.

5. The system of claim 1, wherein said user computer is further configured to request that said visibility engine send said shipping information in at least one of an XML format, a comma-separated value format and a flat file format.

6. The system of claim 1, wherein said user computer is further configured to enable said user to specify a frequency for automatically receiving said shipping information.

7. The system of claim 1, wherein said user computer is further configured to receive at least one of an inbound notification service and an inbound and delivery notification service.

8. The system of claim 1, wherein said visibility engine is further configured to calculate a forecasted delivery date for said inbound package.

9. The system of claim 1, wherein said user computer is further configured to receive a forecasted delivery date for said inbound package.

10. The system of claim 1, wherein said visibility engine is further configured to send to said user computer at least one of a package ship date, scheduled day of delivery, exception update, and a rescheduled date of delivery.

11. The system of claim 1, wherein said user computer is further configured to receive at least one of a package ship date, scheduled day of delivery, exception update, and a rescheduled date of delivery.

12. The system of claim 1, wherein said visibility engine is further configured to capture and send to said user computer at least one of delivery date, delivery time, signature, COD amount, reference numbers, and full delivery address.

13. The system of claim 1, wherein said location is one of two or more locations associated with said user.

14. The system of claim 1, wherein said location is one of two or more locations associated with an account number associated with said user.

15. A computer readable medium comprising computer executable instructions for:
    creating an inbound subscription for a user, who is to receive a package, wherein said inbound subscription specifies:
        at least one location identifier created by said user, who is to receive said package, and associated with a receiving location associated with said user, wherein:

said location identifier is not an address associated with said receiving location, is not an account number associated with said receiving location, and is not a carrier tracking number; and said location identifier is configured such that said user is enabled to assign multiple location identifiers to a single address; and a format and a frequency for automatically receiving inbound package tracking data;

capturing shipping data of packages that are in transit in a carrier system;

identifying packages that are inbound to said receiving location associated with said user by comparing said at least one location identifier against said captured shipping data, wherein packages having shipping information that includes said at least one location identifier are identified as inbound to said receiving location associated with said user;

collecting inbound package tracking data for said identified packages; and transmitting said inbound package tracking data to said user in accordance with said inbound subscription.

16. The computer readable medium of claim 15, wherein said format specified by said inbound subscription includes at least one of an XML file, a comma-separated value file and a flat file.

17. The computer readable medium of claim 15, wherein said inbound subscription further specifies that said inbound package tracking data includes at least one of a ship date, a scheduled day of delivery, an exception update and a rescheduled day of delivery.

18. The computer readable medium of claim 15, wherein said inbound subscription specifies that said inbound package tracking data includes a ship date, a scheduled day of delivery and an exception update.

19. The computer readable medium of claim 18, wherein said inbound subscription specifies that said inbound package tracking data further includes at least one of a delivery date and time, a signature, a COD amount, a reference number and a full delivery address.

20. The computer readable medium of claim 15, wherein the step of transmitting said inbound package tracking data occurs according to said frequency specified by said inbound subscription.

21. The computer readable medium of claim 15, wherein said inbound package tracking data is transmitted in said format specified by said inbound subscription.

22. The computer readable medium of claim 15, further comprising the step of charging said user a fee for said inbound subscription.

23. The computer readable medium of claim 22, wherein said fee is based on a quantity of said packages tracked.

24. The computer readable medium of claim 15, wherein said inbound subscription is associated with a carrier account.

25. The computer readable medium of claim 24, wherein the step of identifying package that are inbound to said user comprises comparing said at least one location identifier and said carrier account against said captured shipping data.

26. A package tracking system that allows a user to receive information about packages that are inbound and outbound from said user, said system comprising:

a carrier database configured to store shipping information for packages that are in transit in a carrier system;

a visibility engine configured to communicate with said carrier database;

a user computer configured to communicate with said visibility engine;

wherein said visibility engine is configured to:

create an inbound subscription for a user, who is to receive a package, wherein said inbound subscription specifies at least one location identifier created by said user and associated with a receiving location associated with said user, wherein said location identifier is not an address associated with said location and is not an account number associated with said location and is a not a carrier tracking number;

enable said user to assign multiple location identifiers to a single address, and identify packages that are inbound to said receiving location by comparing said at least one location identifier against said shipping information, wherein packages having shipping information that includes said at least one location identifier are identified as inbound to said receiving location; and wherein said visibility engine is further configured to create an outbound subscription for a user, wherein said outbound subscription specifies an account identifier associated with said user, and wherein said visibility engine is configured to identify packages that are outbound from said user by comparing said account identifier against said shipping information.

27. The system of claim 26, wherein said visibility engine is further configured to automatically provide package information for packages inbound to and packages outbound from said user at a frequency specified by said user in said inbound or said outbound subscriptions.

28. The system of claim 26, wherein said visibility engine is further configured to provide package information for packages inbound to and packages outbound from said user in a format specified in said inbound or said outbound subscriptions.

29. The system of claim 26, further comprising an online file download tool to automate the retrieval of package information.

30. The system of claim 26, further comprising an automated access and file download application residing on said user computer, wherein said application is configured to generate an XML request according to at least one user-defined parameter and to retrieve and store package information in a location and format specified by said inbound or outbound subscription.

31. The system of claim 26, further comprising a proactive notification tool that provides said user with the ability to request proactive notification of an event in the progress of said package through said carrier system.

* * * * *